United States Patent [19]

Imoto

[11] Patent Number: 5,696,610
[45] Date of Patent: Dec. 9, 1997

[54] COLOR IMAGE READER WITH TWO-STEP COLOR DISPERSION

[75] Inventor: Yoshiya Imoto, Ebina, Japan

[73] Assignee: Fuji Xerox Co., Ltd., Tokyo, Japan

[21] Appl. No.: 543,910

[22] Filed: Oct. 17, 1995

[30] Foreign Application Priority Data

Oct. 19, 1994 [JP] Japan ............ P.HEI.6-278660
Oct. 20, 1994 [JP] Japan ............ P.HEI.6-279806
Oct. 3, 1995 [JP] Japan ............ P.HEI.7-278286

[51] Int. Cl.$^6$ ............................. H04N 1/46; H04N 3/14
[52] U.S. Cl. ............... 358/509; 358/505; 358/511; 358/515; 348/276; 348/277
[58] Field of Search ................. 358/505, 509, 358/511, 512, 515; 359/615, 833, 834, 211, 831, 837, 717; 348/276, 277, 278, 279, 280, 224, 225; 250/233, 232

[56] References Cited

U.S. PATENT DOCUMENTS 4,882,619  11/1989  Hasegawa et al. ............... 358/55
4,926,249  5/1990  Ichihara et al. .................... 358/75
5,329,384  7/1994  Setani et al. ...................... 358/514

FOREIGN PATENT DOCUMENTS

A-1-237619  9/1989  Japan.
A-3-42686  2/1991  Japan.
A-3-89768  4/1991  Japan.

*Primary Examiner*—Edward L. Coles, Sr.
*Assistant Examiner*—Mark Wallerson
*Attorney, Agent, or Firm*—Oliff & Berridge

[57] ABSTRACT

Light reflected from a document surface is given first color dispersion when passing through a prism interface and second color dispersion when passing through another prism interface. The second color dispersion is in an opposite direction to and has larger partial dispersion in a blue range than the first color dispersion. The prism interface may be replaced by an interface of two lenses which interface is a curved surface whose center of curvature is deviated from the optical axis of the reflected light in the auxiliary scanning direction.

10 Claims, 32 Drawing Sheets

| SURFACE NUMBER i | RADIUS OF CURVATURE $r_i$ | SURFACE SPACING $d_i$ | REFRACTIVE INDEX $n_i$ | ABBE NUMBER $\nu_i$ | REMARKS |
|---|---|---|---|---|---|
| 0 | — | +422.20 | — | — | OBJECT SURFACE |
| 1 | +46.30 | +6.00 | 1.6910 | 54.71 | |
| 2 | +116.60 | +6.00 | 1.6989 | 30.05 | ECCENTRIC SURFACE |
| 3 | +102.10 | +0.10 | — | — | |
| 4 | +28.17 | +6.01 | 1.7440 | 44.70 | |
| 5 | +80.24 | +2.20 | 1.6718 | 31.98 | |
| 6 | +20.19 | +9.98 | — | — | |
| 7 | — | +14.18 | — | — | DIAPHRAGM SURFACE |
| 8 | −20.52 | +2.20 | 1.6987 | 30.30 | |
| 9 | −212.95 | +6.48 | 1.7440 | 44.70 | |
| 10 | −27.80 | +0.10 | — | — | |
| 11 | −345.08 | +5.40 | 1.7440 | 44.70 | |
| 12 | −52.64 | — | — | — | |
| 13 | +0.00 | +70.06 | — | — | IMAGE SURFACE |

| SURFACE NUMBER i | RADIUS OF CURVATURE $r_i$ | SURFACE SPACING $d_i$ | REFRACTIVE INDEX $n_i$ | ABBE NUMBER $\nu_i$ | REMARKS |
|---|---|---|---|---|---|
| 0 | — | +400.91 | — | — | OBJECT SURFACE |
| 1 | — | +6.00 | 1.4970 | 81.61 | PLANE |
| 2 | — | +6.00 | 1.4983 | 65.14 | COLOR DISPERSION SURFACE |
| 3 | — | +10.00 | — | — | PLANE |
| 4 | +45.23 | +6.00 | 1.6910 | 54.71 | |
| 5 | +110.22 | +6.00 | 1.6989 | 30.05 | ECCENTRIC SURFACE |
| 6 | +99.20 | +0.10 | — | — | |
| 7 | +27.74 | +5.76 | 1.7440 | 44.70 | |
| 8 | +79.92 | +2.20 | 1.6732 | 31.88 | |
| 9 | +19.90 | +9.98 | — | — | |
| 10 | — | +14.04 | — | — | DIAPHRAGM SURFACE |
| 11 | −20.43 | +2.20 | 1.6971 | 30.39 | |
| 12 | −227.59 | +6.45 | 1.7440 | 44.70 | |
| 13 | −27.67 | +0.10 | — | — | |
| 14 | −363.66 | +5.89 | 1.7440 | 44.70 | |
| 15 | −53.07 | — | — | — | |
| 16 | — | +69.27 | — | — | IMAGE SURFACE |

PIXEL PITCH 14 μm

| SURFACE NUMBER i | RADIUS OF CURVATURE $r_i$ | SURFACE SPACING $d_i$ | REFRACTIVE INDEX $n_i$ | ABBE NUMBER $\nu_i$ | REMARKS |
|---|---|---|---|---|---|
| 0 | +0.00 | +420.60 | — | — | OBJECT SURFACE |
| 1 | +47.97 | +7.20 | 1.6910 | 54.71 | |
| 2 | +9934.16 | +2.60 | 1.6989 | 30.05 | |
| 3 | +137.29 | +0.10 | — | — | ECCENTRIC SURFACE |
| 4 | +31.20 | +9.20 | 1.4970 | 81.61 | |
| 5 | +884.25 | +2.60 | 1.4983 | 65.14 | |
| 6 | +20.75 | +9.79 | — | — | ECCENTRIC SURFACE |
| 7 | — | +13.24 | — | — | DIAPHRAGM SURFACE |
| 8 | −20.94 | +2.60 | 1.7100 | 29.68 | |
| 9 | +841.74 | +7.24 | 1.7440 | 44.70 | |
| 10 | −28.86 | +0.10 | — | — | |
| 11 | −465.78 | +4.76 | 1.7440 | 44.65 | |
| 12 | −53.32 | — | — | — | |
| 13 | +0.00 | +70.83 | — | — | IMAGE SURFACE |

PIXEL PITCH 14 μm

R1 G1 B1 R2 G2 B2 R3 G3 B3 R4 G4 B4

| PERIPHERAL LIGHT WITHOUT INCLINATION OF COLOR DISPERSION SURFACE | | PERIPHERAL LIGHT WITH INCLINATION OF COLOR DISPERSION SURFACE (BOTTOM-LEFT TO TOP-RIGHT) | PERIPHERAL LIGHT WITH INCLINATION OF COLOR DISPERSION SURFACE (TOP-LEFT TO BOTTOM-RIGHT) |
|---|---|---|---|
| R |  |  |  |
| G |  |  |  |
| B |  |  |  |

|—| 0.05mm |—|

COLOR IMAGE READER WITH TWO-STEP COLOR DISPERSION

BACKGROUND OF THE INVENTION

1. Field of the Invention

This invention relates to a color image reader for exposing and scanning an image document and converting it into an electric image signal and, in particular, to a color image reader for separating light reflected from a document into three primary colors and reading them.

2. Description of the Related Art

Hitherto, the following five types of readers have been used as means for scanning and reading a color image by using line sensors:

1) A reader for sequentially changing colors of light radiated from a light source to which a document is exposed or colors of filters allowing reflected light to pass through and repeating exposure and scanning of the document for each of the primary three colors for reading the image of the component of each color with a monochrome image sensor.

2) A reader comprising color filters of three colors put on photosensitive elements on one line of an image sensor in order, the photosensitive elements for reading the image of the component of the color responsive to each filter.

3) A reader using a dichroic prism 101 as shown in FIG. 43 to make color separation of reflected light from a document into three optical paths and reading them by three image sensors 102.

4) A reader having read lines of three colors comprising filters of different colors, provided on one chip of an image sensor for reading incident light from different positions on a document and correcting image signals for matching the signal at the same position on the document surface.

5) A reader having line image sensors for reading image lights of different colors, provided on one chip and making optical color separation of reflected light from the same position on a document, the line image sensors for reading the light.

Of the five types of readers, the reader of item 1) needs to repeat exposure and scanning three times; it is at a disadvantage in that it does not support speeding up read.

The reader of item 2) reads an image of one color every three devices; the device density must be heightened to provide high picture quality and high resolution. Thus, it is often used for a system in which photosensitive elements are brought into intimate contact with a document for read; it takes a structure of arranging a number of CCD chips. Such a structure is at a disadvantage in that the read area boundaries between the chips are easy to see on a read image due to the characteristic mismatch between the chips. Use of such a system for a microminiaturized sensor is proposed; 3-color photosensitive elements of red (R), green (G), and blue (B) are arranged in a line and output of each device is read by three transfer electrodes (Technical Report of the Institute of Television Engineers of Japan, Information Input 1992, "Highspeed Drive—Point Sequential CCD Color Linear Sensor"). However, since the system takes a structure of arranging 3-color photosensitive elements sequentially, the device area per color lessens, lowering sensitivity. When the number of devices is increased to provide high resolution, even if the size of one photosensitive element is made as small as possible, the chip becomes large, increasing costs and causing the chip to warp.

Since the reader of item 3) comprises three image sensors reading light whose color is separated into three optical paths, the three image sensors must be aligned strictly for installation. Thus, the reader is at a disadvantage in that it requires a large number of steps for adjustment.

The reader of item 4) has three device lines of R, G, and B formed on the same semiconductor substrate, the device line of one color being made of one chip, thus does not have the disadvantages of the readers of items 1), 2) and 3).

However, when the reader reads and scans an image, the three read lines do not read the same position on the document surface at the same time. Thus, a memory must be used to delay information on color read in advance for correcting the signals from the three lines so that the image signal at the same position is output at the same time. The high-speed FIFO memory and memory control circuit required for the correction increase costs and an inexpensive color reader cannot be supplied.

Since the correction (gap correction) is made by replacing the read position difference with the read time lag, it assumes that the read and scanning speed is completely equal; if the scan speed varies due to mechanical drive system vibration, etc., local color displacement occurs. Thus, requirement for stability of the scanning speed becomes strict and the mechanical drive system needs to be highly accurate, increasing costs.

Further, since 3-color read positions differ and light is sharply gathered for illumination to raise illumination efficiency, if a read document is picked up from platen glass, the light quantity for each read color changes unbalancedly, causing color balance of read data to change, forming an ugly image strong in yellow.

The reader of item 5) is disclosed in, for example, Japanese Patent Laid-Open Nos. Hei. 1-237619 and Hei. 3-42686.

A reader disclosed in Japanese Patent Laid-Open No. Hei. 1-237619 is provided with a beam splitter 111 using a multilayer dichroic mirror for separating image light formed by a lens 112 into three colors and a 3-line monochrome image sensor 113 for reading the colors, as shown in FIG. 44.

A reader disclosed in Japanese Patent Laid-Open No. Hei. 3-42686 exposes a document surface to three color lights with a narrow wavelength band and separates reflected light into colors by a color separation prism, then reads them by corresponding line sensors. The reader can also prevent so-called crosstalk (an phenomenon in which reflected light from the part adjacent to a read line on a document surface is incident on the line sensor).

However, the reader disclosed in Japanese Patent Laid-Open No. Hei. 1-237619 requires that installation accuracy of the beam splitter 111 and the image sensor 113 should be strict, increasing manufacturing costs. The manufacturing costs of the beam splitter itself are also high. Further, if narrow slits are used and the width in the auxiliary scanning direction of reflected light is not limited, slit images separated into three colors as shown in FIG. 44 overlap each other, causing optical crosstalk to occur. Thus, it is necessary to use highly accurate slits and limit read lines in the auxiliary scanning direction.

Unless three line sensors are spaced from each other to a certain degree (about ten and several lines), image separation is not sufficiently executed; if an attempt is made to largely space the image formation positions of color lights from each other and accurately align the image formation positions, the transparent layer thickness between dichroic mirrors needs to be adjusted precisely, furthermore increasing costs.

On the other hand, since the reader described in Japanese Patent Laid-Open No. Hei. 3-42686 has a spectral characteristic of illumination as a narrow band characteristic, crosstalk of each color light is reduced, but the illumination light quantity lowers.

As we have discussed, the conventional readers of items 1)–5) have the disadvantages; however, the reader of item 5) has a plurality of line image sensors disposed on one substrate, offering the advantage of easy installation. Further, each line reads reflected light from the same position on a document surface and complicated processing need not be performed for image signals. Thus, it provides large utility as a color image reader and may also be able to reduce costs. Particularly, attention is focused on a reader using the fact that the refractive index varies depending on the wavelength of image light for color separation like the reader disclosed in Japanese Patent Laid-Open No. Hei. 3-42686. A reader having document illumination light having a spectral characteristic of a wide band to such an extent that the light quantity is not in short supply may be used to solve the problem of lowering the illumination light quantity, and a reader having on-chip filters disposed on a sensor for blocking components of other colors may be effective against the effect of crosstalk. This means a reader using line sensors as shown in FIG. 46 for reading each color light resulting from color dispersion by a prism as shown in FIG. 45; for example, light of red (R) reflected at a position distant from a read line (line 1) is subjected to color dispersion by the prism, then applied to the green (G) line sensor, but blocked by the on-chip-filter so as not to affect read of the green (G) line sensor.

However, even such a reader has the following problem:

When color dispersion is produced by the prism, partial dispersion of a blue range increases due to the color dispersion characteristic of glass and the spacing between blue (B) and green (G) photosensitive element lines is greater than that between green (G) and red (R) photosensitive element lines. Therefore, if the color dispersion amount as a whole is made reasonably large and the read lines are spaced largely from each other, MTF (modulation transfer function) in the auxiliary scanning direction, namely, resolution lowers in the blue range because partial dispersion is large. This is caused by the following phenomenon:

Bluish green (BG) light from the read line (line-1) forms an image at position A as shown in FIG. 45.

Since partial dispersion is large in the blue range although the blue (B) and bluish green (BG) wavelength difference is small, the position is slightly distant from the blue (B) sensor position. This indicates that reflected light from a position (line-2) slightly distant from the read line on the document surface is incident on the blue (B) sensor; the bluish green (BG) light, which is close to the blue (B) light in wavelength, passes through the filter, causing crosstalk to occur. If the bluish green (BG) light incident on the blue (B) sensor is reflected light from a position extremely near the read line (line 1), the MTF less lowers, but it is reflected light from the position (line 2) slightly distant from the read line, thus the MTF remarkably lowers.

On the other hand, a reader having line sensors of three colors small spaced from each other and using a prism with small dispersion as a whole is possible as means for improving the MTF lowering in the blue range.

However, if such means is used, the photosensitive element size becomes small and sensitivity lowers; in addition, a sensor of a special arrangement, as shown in FIG. 47, with three device lines not equally spaced from each other is required.

When image light reflected on the document surface is read with a large number of photosensitive elements arranged in the main scanning direction, the image light has a view angle in the main scanning direction and reflected light from both sides of the document is incident on the prism and lens from a slightly oblique direction. Since the prism forms an optical plane in the main scanning direction, the incidence and outgoing radiation angles become the same, but refraction occurs on the incidence and outgoing radiation faces, as shown in FIG. 48, producing color dispersion. Thus, magnification chromatic aberration occurs on both sides in the main scanning direction of the image, producing color displacement in the read image.

SUMMARY OF THE INVENTION

It is therefore an object of the invention to provide a color image reader which can form images of light beams of respective colors produced by color separation that is based on the fact that the refractive index varies depending on the wavelength at substantially equal spacings on the sensor surface, to thereby enable accurate image light reading, or which can prevent magnification chromatic aberration from occurring in light beams of respective colors produced by color dispersion.

To the end, according to a first aspect of the invention, there is provided a color image reader comprising a lamp for exposing a document surface, first color dispersion means for producing color dispersion in light reflected from the document surface being exposed by the lamp, second color dispersion means for producing color dispersion in the reflected light in an opposite direction to the color dispersion by the first color dispersion means with larger partial dispersion in a blue range than the first color dispersion means, and means for reading an image carried by the reflected light subjected to color dispersion by the first and second color dispersion means.

According to a second aspect of the invention, in the color image reader of the first aspect, the first and/or second color dispersion means is a prism unit.

According to a third aspect of the invention, the color image reader of the first aspect further includes a lens unit for forming an image of the reflected light, wherein the first and/or second color dispersion means is made of adjacent lenses contained in the lens unit.

According to a fourth aspect of the invention, in the color image reader of the second aspect, an interface between transparent optical members forming the prism unit is inclined from the optical axis of the reflected light in the auxiliary scanning direction.

According to a fifth aspect of the invention, in the color image reader of the third aspect, an interface between the adjacent lenses is a curved surface and the center of curvature thereof is decentered from the optical axis of the reflected light in the auxiliary scanning direction.

According to a sixth aspect of the invention, in the color image reader of the second aspect, an interface between transparent optical members forming the prism unit is inclined from the optical axis of the reflected light in the main scanning direction.

According to a seventh aspect of the invention, in the color image reader of the third aspect, an interface between the adjacent lenses is a curved surface and the center of curvature thereof is from the optical axis of the reflected light decentered in the main scanning direction.

According to an eighth aspect of the invention, in the color image reader of the first aspect, the first and/or second color dispersion means is made of two transparent optical members different in Abbe number.

According to a ninth aspect of the invention, in the color image reader of the first aspect, the first and/or second color dispersion means is made of two transparent optical members being different in Abbe number and having almost the same wavelength range in which refractive indices vary with the wavelength.

According to a tenth aspect of the invention, there is provided a color image reader comprising a lamp for exposing a document surface, a lens unit containing a plurality of lenses for forming an image of light reflected from the document surface, and an image sensor being placed at an image formation position of the reflected light and comprising a read line having a large number of photosensitive elements arranged in the main scanning direction, wherein image light is read by electrical scanning of the image sensor in the main scanning direction and is read by moving the reading position in the auxiliary scanning direction, and wherein at least two adjacent lenses contained in the lens unit are made of transparent optical members different in Abbe number, and are adjacent to each other with a curved surface as an interface therebetween, the center of curvature of the curved surface being decentered from the optical axis of the lens unit in the main or auxiliary scanning direction.

In the first aspect of the invention, the first and second color dispersion means produce color dispersion by using the fact that the refractive index varies depending on the light wavelength; the first color dispersion means produces color dispersion in a predetermined direction and the second color dispersion means produces color dispersion in an opposite direction. Each of the first and second color dispersion means may be an interface between an optical member such as glass and the atmosphere, an interface between two types of optical members, or a combination thereof.

The partial dispersion in the blue range refers to the ratio of the partial dispersion in the blue range to color dispersion in other ranges.

In the third aspect of the invention, the first and/or second color dispersion means can be an interface between a lens and the atmosphere, an interface between two adjacent lenses, or a combination thereof; the interface may be a plane or a lens curved surface.

In the ninth aspect of the invention, "almost the same wavelength range in which refractive indices vary with the wavelength" means that although the refractive index varies slightly depending on the wavelength for each member and distributes in a certain range, two glass members have almost the same ranges when the entire ranges are viewed macroscopically. This definition includes a case where they have almost the same average refractive index over the entire wavelength range, and a case where they have almost the same refractive index for a specific wavelength.

In the invention, the glass members are transparent optical members that can be used for optical lenses and prisms. They are not limited to mineral materials, but include transparent plastics.

The functions of the color image reader according to the invention will be described below.

Since the color image reader of the first aspect has the first and second color dispersion means, reflected light from a document surface is dispersed by the first color dispersion means and further refracted by the second color dispersion means, and an image is formed on the sensor surface.

FIG. 49 shows a color dispersion state in the reader, which will be discussed. In the figure, the color dispersion means is a prism unit 121 containing a plurality of prisms brought into intimate contact with each other for producing color dispersion on the interface between the adjacent prisms.

First, assuming that only a first color dispersion surface 122 (first color dispersion means) exists, reflected light from the document surface is separated on the first color dispersion surface 122 and red (R), green (G), and blue (B) lights pass through optical paths indicated by $R_1$, $G_1$, and $B_1$ respectively for forming an image on a sensor surface 124. The image formation positions become positions spaced $A_1$, $A_2$, and $A_3$ from the optical axis.

On the other hand, assuming that only a second color dispersion surface 123 (second color dispersion means) exists, the second color dispersion surface 123 is adapted to produce color dispersion in the opposite direction to the first color dispersion surface 122; light beams dispersed by the second color dispersion surface are refracted in the opposite direction to the light dispersed on the first color dispersion surface and pass through optical paths indicated by $R_2$, $G_2$, and $B_2$ in FIG. 49 for forming an image on the sensor surface 124. The image formation positions become positions spaced $a_1$, $a_2$, and $a_3$ from the optical axis.

Comparing the image formation positions $A_1$, $A_2$, and $A_3$ with $a_1$, $a_2$, and $a_3$, partial dispersion in the blue range on the second color dispersion surface 123 is larger than partial dispersion on the first color dispersion surface 122, thus the ratio of $a_3$ to $a_2$ or $a_1$ becomes larger than the ratio of $A_3$ to $A_2$ or $A_1$. Therefore, color lights refracted by both the first and second color dispersion surfaces pass through optical paths indicated by R, G, and B in FIG. 49 for forming an image at positions almost equally spaced on the sensor surface 124.

An image can be formed at proper positions without making an overlarge separation distance from the optical axis by properly selecting the color dispersion surface angle, etc.

Since the color image reader of the second aspect comprises the color dispersion means made of a prism or two or more prisms in combination, reflected light from the document surface can be separated into red (R), green (G), and blue (B) colors by a simple optical system and an image of the image lights can be formed at proper positions for read. The inclination of the interface for causing color dispersion can be made large and increasing the dispersion amount, namely, the separation distance of each color is also facilitated.

Since the color image reader of the third aspect comprises the color dispersion means made of one lens or an interface between two adjacent lenses, an image of image light incident from the vicinities of both ends in the horizontal direction can also be formed without producing magnification chromatic aberration by properly selecting the lens curved surface. The color dispersion means can be disposed in the image forming lens, decreasing the number of parts and costs. Further, the color dispersion surface is formed as a sphere, whereby the decentering amount can also be finely adjusted.

In the color image reader of the fourth aspect, the interface between glass members making up the prism unit is inclined from the optical axis in the auxiliary scanning direction, so that reflected light from a document is subjected to color dispersion in the auxiliary scanning direction and an image is formed at proper positions. Image light is read by using the image sensor comprising a plurality of read lines disposed in the auxiliary scanning direction each consisting of a large number of photosensitive elements arranged in the main scanning direction; each line reads each color light subjected to color dispersion. At this time, large blue light dispersion can be corrected for forming an image of color lights, so that MTF reduction can be prevented.

In the color image reader of the fifth aspect, two lenses contained in the lens unit are made adjacent with a curved surface as the interface therebetween and the center of curvature thereof is decentered in the auxiliary scanning direction to the optical axis, thus the lens curved surface is inclined in the auxiliary scanning direction and reflected light from the document surface is separated into colors in the auxiliary scanning direction. As in the color image reader of the fourth aspect, large blue light dispersion is corrected and MTF lowering is prevented.

In the color image reader of the sixth aspect, the interface between glass members making up the prism unit is inclined from the optical axis in the main scanning direction, so that reflected light from a document is separated into colors in the main scanning direction. If an image sensor comprising a large number of photosensitive elements arranged in the main scanning direction for every three of the photosensitive elements to sense red (R), green (G), and blue (B) image lights with on-chip filters mounted is used, image light from the same position on the document can be separated into colors for application to the three adjacent photosensitive elements R, G, and B, as shown in FIG. 50. Thus, edges of black characters can be prevented from being colored due to displacement of read positions.

In the color image reader of the seventh aspect, two lenses contained in the lens unit are made adjacent with a curved surface as the interface therebetween and the center of curvature thereof is decentered in the main scanning direction to the optical axis, thus reflected light from a document is separated into colors in the main scanning direction. As in the color image reader of the sixth aspect, edges of black characters can be prevented from being colored due to displacement of read positions among the three colors.

Since the color image reader of the eighth aspect uses two transparent optical members different in Abbe number, color dispersion can be efficiently produced on the interface between the transparent optical members. Thus, the color dispersion amount can be adjusted by changing only the interface angle, and the outer form of the color dispersion means can be made as an optical plane with less aberration occurrence.

In the color image reader of the ninth aspect, the refractive index zones of two adjacent glass members are almost the same, thus the whole image light is not largely refracted. This eliminates a large optical path length difference on both sides of the optical path width, suppressing astigmatism, improving resolution.

In this reader, color dispersion is produced by the two adjacent transparent optical members which differ in Abbe number.

In the color image reader of the tenth aspect, a document is exposed to the lamp and an image of reflected light from the document is formed on the line image sensor through the lens unit. Since the center of curvature of the lens curved surface as the interface between two adjacent lenses is decentered from the optical axis in the main or auxiliary scanning direction, the lens curved surface is inclined in the main or auxiliary scanning direction. Further, the glass members on both sides of the lens curved surface differ in Abbe number, thus image light is subjected to color dispersion in the main or auxiliary scanning direction. Thus, each color light resulting from the color dispersion can be read by the image sensor. On the other hand, if the center of curvature of the interface between the two lenses is decentered only in either the main or auxiliary scanning direction, color dispersion is produced in the decentering direction, but in the direction vertical to the decentering direction, the surface functions as one lens curved surface of the lens unit, producing little chromatic aberration (magnification chromatic aberration). Therefore, an image can be read in a good tone.

Color dispersion can be produced by the lens unit without using additional prisms, reducing the number of components and costs.

Further, the tilt angle of the lens curved surface in the main or auxiliary scanning direction is set by decentering the center of curvature of the lens curved surface, so that it can be set extremely accurately.

DESCRIPTION OF THE PREFERRED EMBODIMENTS

Referring now to the accompanying drawings, described preferred embodiments of the invention will be described.

First Embodiment

Figure 1A:
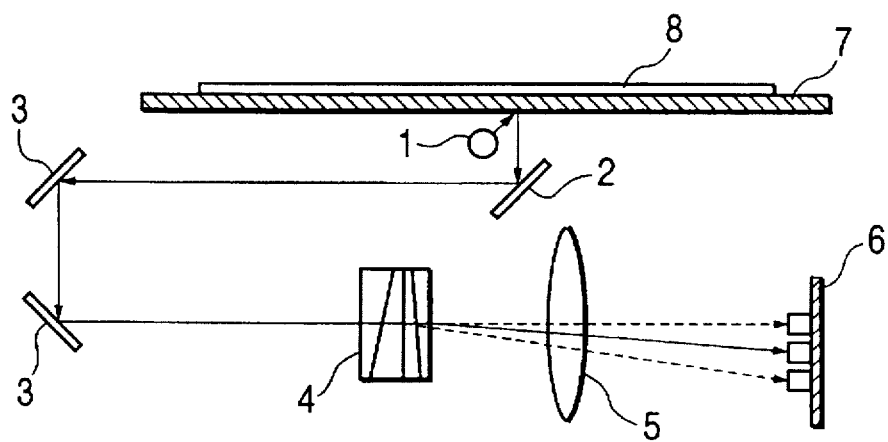
FIGS. 1A and 1B are a schematic drawing showing the configuration of a color image reader according to a first embodiment of the invention and a sectional view showing the structure of a prism unit used in the color image reader.
Figure 1B:
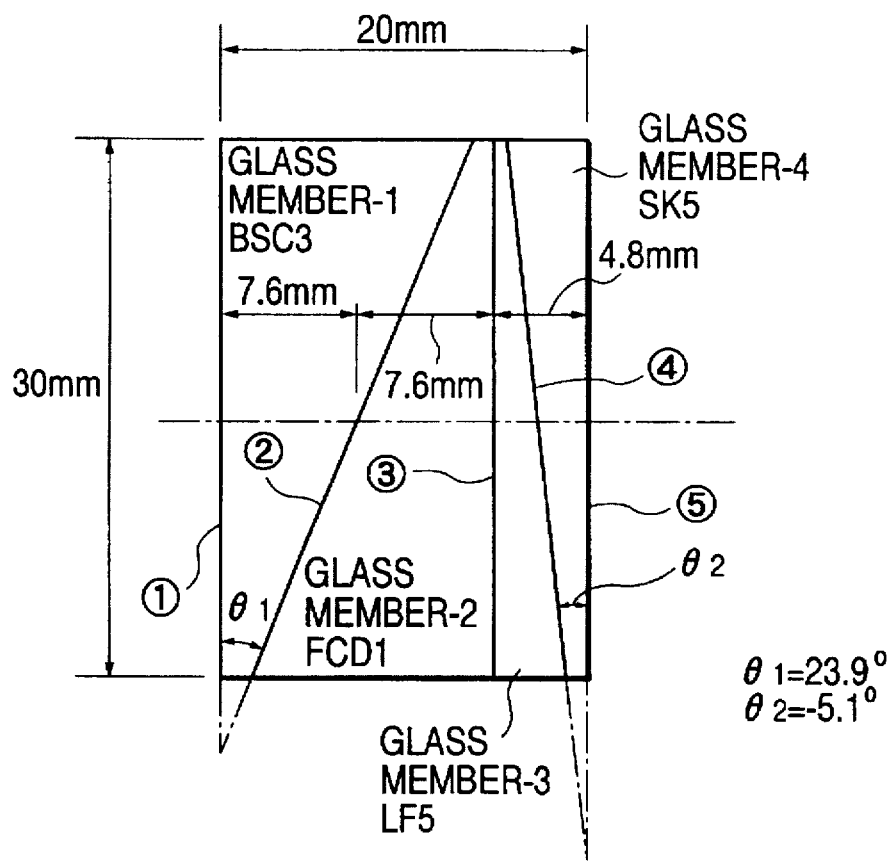

FIGS. 1A and 1B are a schematic drawing showing the configuration of a color image reader according to a first embodiment of the invention and a sectional view showing the structure of a prism unit used in the color image reader.

The embodiment is adapted to produce color dispersion in the auxiliary scanning direction with respect to the optical axis of image light at the interface between prisms of first and second color dispersion means brought into intimate contact with each other.

11

[Configuration of reader of first embodiment]

The color image reader has a lamp 1 running for exposing a document 8 on platen glass 7, a full-rate mirror 2 running with the lamp 1, half-rate mirrors 3 running at half the rate of the lamp 1 and the full-rate mirror 2, a prism unit 4 for producing color dispersion of reflected light on the document surface, a lens 5 for forming an image of each color light resulting from color dispersion by the prism unit 4, and a CCD image sensor 6 being disposed at image formation positions of color lights for converting incident light into an electric image signal.

The full-rate mirror 2 is placed so as to guide image light reflected on the document surface into the half-rate mirror 3 and the half-rate mirrors 3 run in the same direction at half the rate of the full-rate mirror 2 for holding the optical path length constant.

The prism unit 4 comprises four glass members overlaid on each other, as shown in FIG. 1B; surface-1, surface-2, and surface-3 are set at right angles to the optical axis. The surface-2, an interface between glass member-1 and glass member-2, forms a first color dispersion surface and the surface-4, an interface between glass member-3 and glass member-4, forms a second color dispersion surface. Each pair of the glass member-1 and glass member-2 and glass member-3 glass member- 4 is selected so that the glass members are almost the same in refractive index and large in Abbe number difference. Table 1 lists the refractive index ($n(\lambda_d)$), Abbe number ($v_d$), and partial dispersion ratio ($P_{gF}$) of the glass members.

TABLE 1

|  | $n(\lambda_d)$ | $v_d$ | $P_{gF}$ |
| --- | --- | --- | --- |
| BSF3 | 1.498 | 65.1 | 0.529 |
| FCD1 | 1.497 | 81.6 | 0.539 |
| LF5 | 1.589 | 40.9 | 0.575 |
| SK5 | 1.581 | 61.4 | 0.540 |

The refractive index $n(\lambda_d)$ means a refractive index for the following d-line beam. The Abbe number $v_d$ and the partial dispersion ratio $P_{gF}$ represent characteristics for the following four light beams of the typical wavelengths and are expressed by the following equations:

C-line beam: wavelength $\lambda_C=656.3$ nm
d-line beam: wavelength $\lambda_d=587.6$ nm
F-line beam: wavelength $\lambda_F=486.1$ nm
g-line beam: wavelength $\lambda_g=435.8$ nm $$v_d = \frac{n(\lambda_d) - 1}{n(\lambda_F) - n(\lambda_C)}$$

$$P_{gF} = \frac{n(\lambda_g) - n(\lambda_F)}{n(\lambda_F) - n(\lambda_C)}$$

Figure 2:
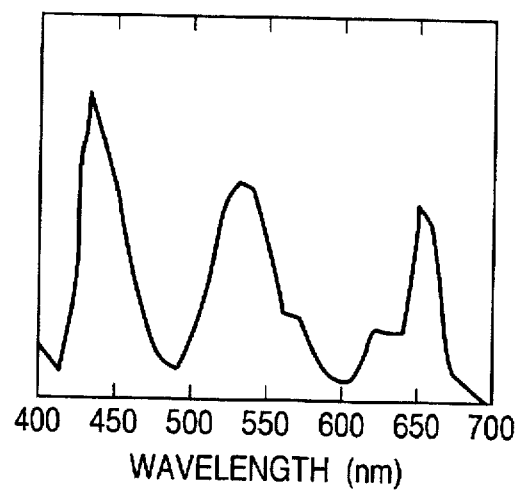
FIG. 2 is a graph showing a spectral characteristic of a lamp used in the color image reader shown in FIG. 1A.

The lamp 1 is a rare gas fluorescent lamp of 3-wavelength type and has a spectral characteristic of illumination system as shown in FIG. 2.

Figure 3:
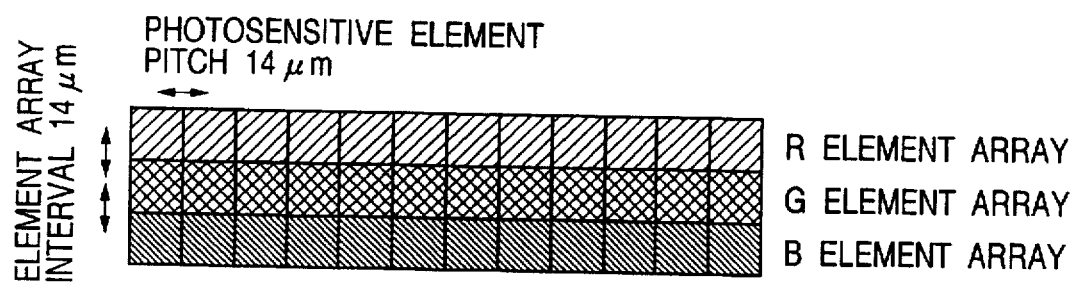
FIG. 3 is an illustration showing the arrangement of photosensitive elements of a line image sensor used in the color image reader shown in FIG. 1A.

The CCD image sensor 6 comprises three read lines placed in the auxiliary scanning direction each consisting of a large number of devices arranged in the main scanning direction, as shown in FIG. 3. The lines are red (R), green (G), and blue (B) read lines provided by filters from the optical path side and are placed at the same equal spacing as the device pitch in the main scanning direction.

Figure 4:
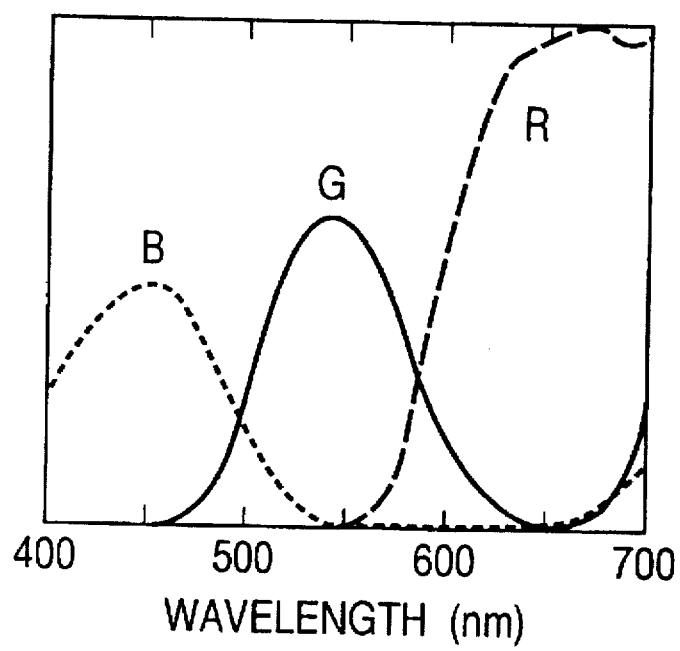
FIG. 4 is a graph showing a spectral sensitivity characteristic of the line image sensor shown in FIG. 3.
Figure 5:
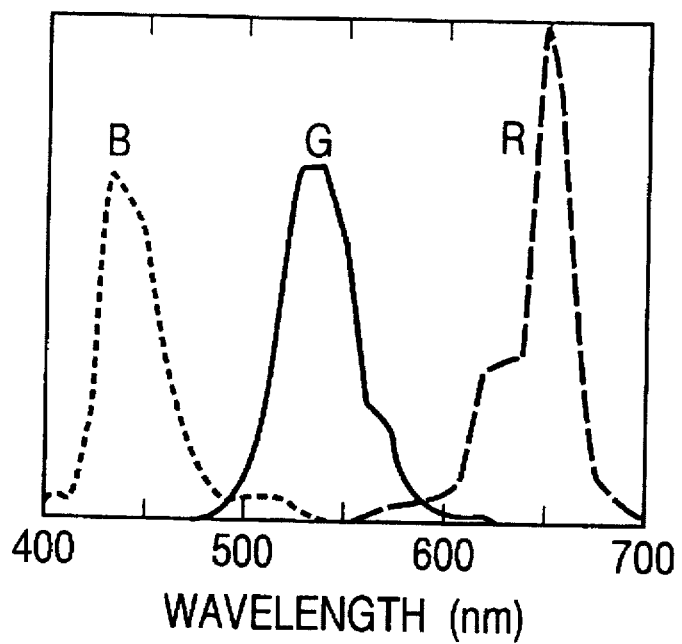
FIG. 5 is a graph showing a spectral response characteristic of a read system resulting from multiplying the lamp characteristic shown in FIG. 2 by the line image sensor characteristic shown in FIG. 4.

The CCD image sensor 6 has a spectral sensitivity characteristic as shown in FIG. 4. FIG. 5 shows the spectral response characteristic as the reader resulting from multiplying by the spectral characteristic of the illumination system shown in FIG. 2.

12

Figure 49:
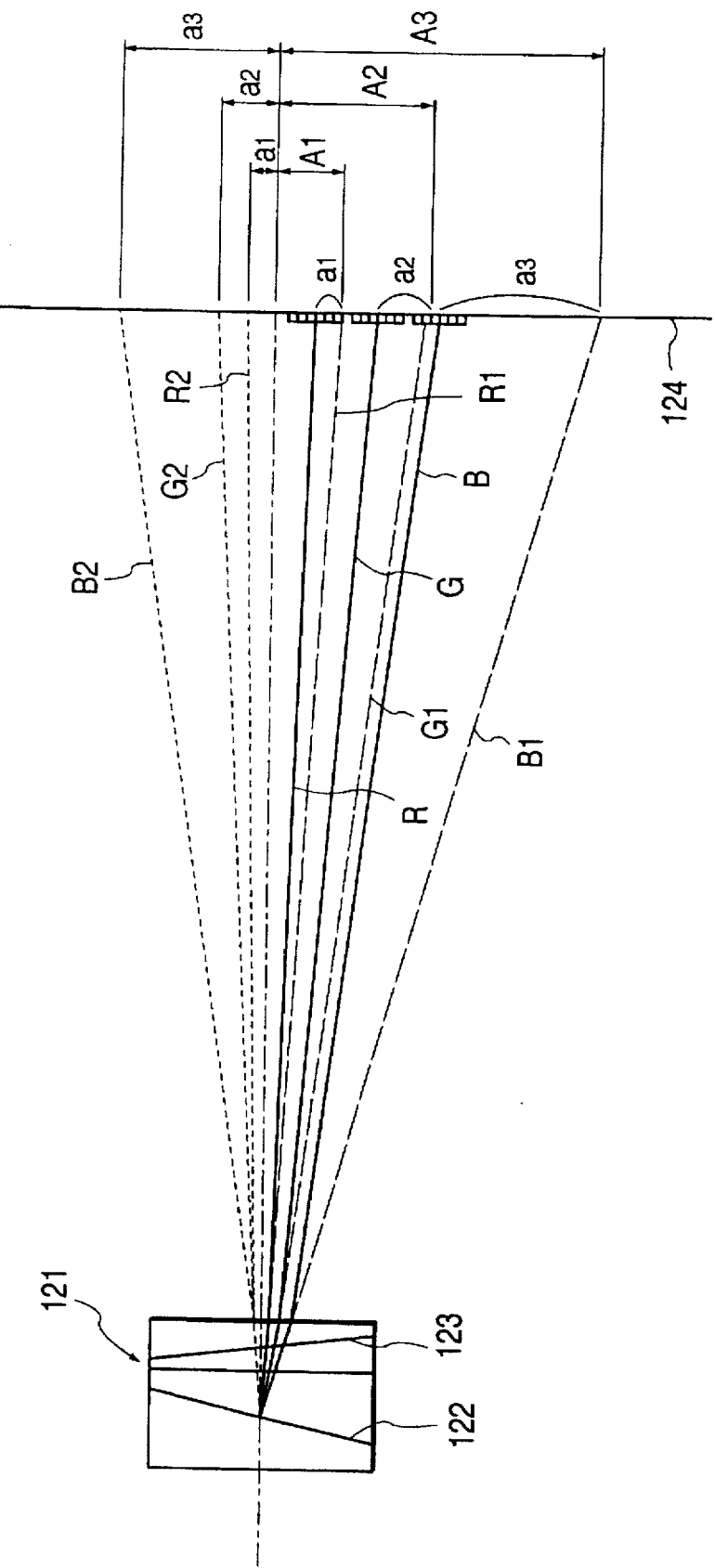
FIG. 49 is an illustration showing a color dispersion state in the color image reader of the invention.

With the color image reader, a color image of a document 8 placed on the platen glass 7 is exposed by the lamp 1 and reflected light is guided into the prism unit 4 via the full-rate mirror 2 and the half-rate mirrors 3 and 3. The prism unit 2 has two color dispersion surfaces as shown in FIG. 1B; color dispersion is produced on the first color dispersion surface (surface-2) and further on the second color dispersion surface (surface-4), each color light is separated into colors in the opposite direction to the first color dispersion surface, as shown in FIG. 49. An image is formed on the sensor surface by the lens 5. Referring to FIG. 49, the first dispersion surface refracts the colors in a direction below the optical axis of the prism unit 2. The second dispersion surface refracts the colors in a direction above the optical axis of the prism unit 2, i.e., in a direction opposite to that of the first dispersion surface. As the color dispersion nature on the color dispersion surfaces, partial dispersion in the blue range becomes large and image light after passing through the first dispersion surface has the spacing between green light (G) and blue light (B) larger than that between red light (R) and green light (G), but is refracted in the opposite direction on the second dispersion surface with large partial dispersion in the blue range for correcting the color light spacing, so that red (R), green (G), and blue (B) image lights form an image on three lines of the CCD image sensor arranged at equal spacing. Therefore, without lowering sensitivity by narrowing the spacing between red and green read lines of the sensor, a color image can be read using the sensor having a sufficient device area such that the picture element pitch in the main scanning direction and the read line spacing become the same, as shown in FIG. 3.

[Effects of reader of first embodiment]

Next, the effect of improving the nature of the color dispersion surface where partial dispersion increases in the blue range as described above will be discussed with reference to FIG. 6.

Figure 6:
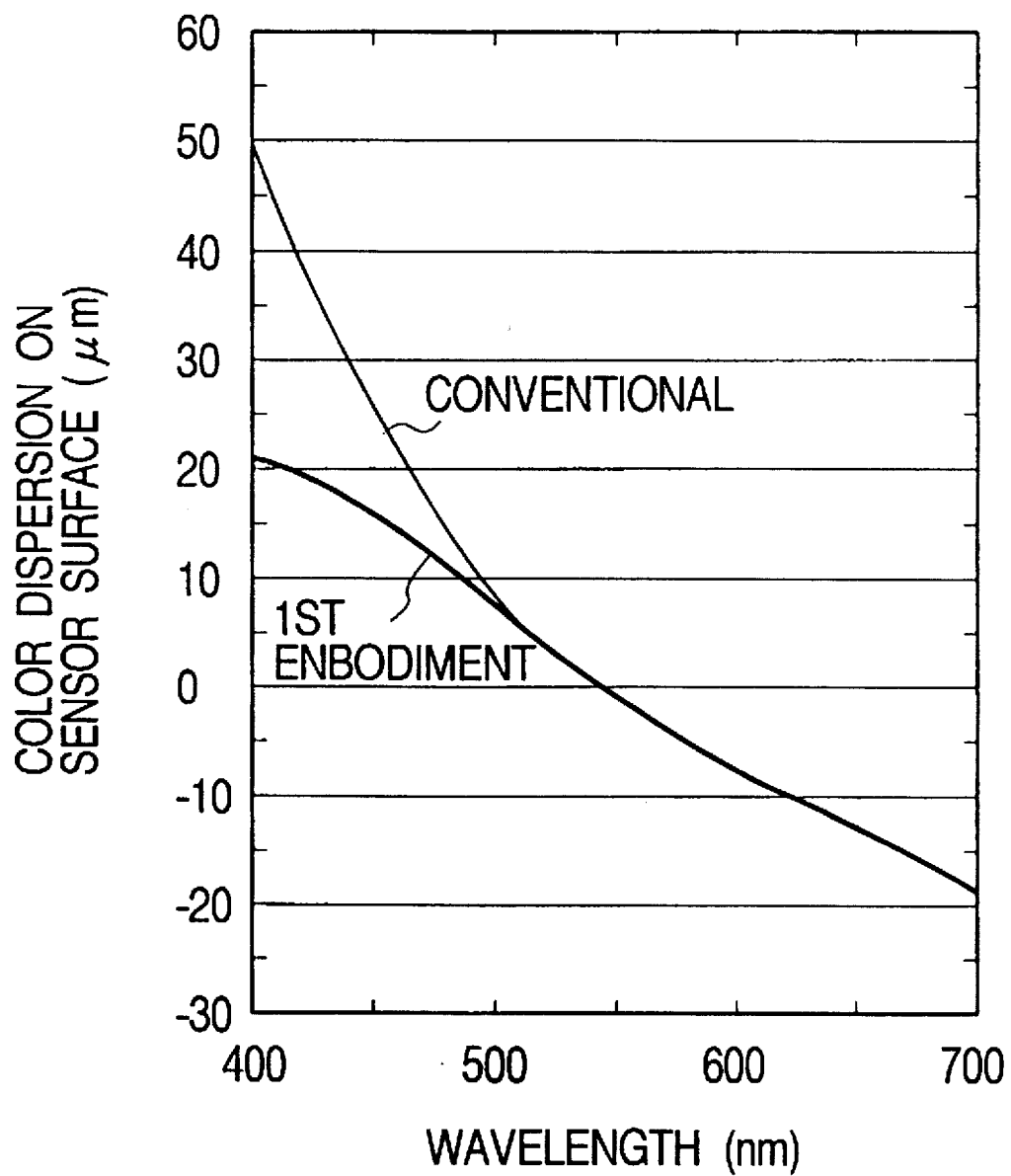
FIG. 6 is a graph showing the relationship between the wavelength of light whose color is dispersed by the prism unit shown in FIG. 1B and the color dispersion amount on a sensor surface by comparison with that in a conventional color image reader.

FIG. 6 shows the color dispersion amounts on the sensor surface, namely, the separation amount from the optical axis of image formation position with respect to light different in wavelength; in the embodiment in which two color dispersion surfaces different in partial dispersion are used for correction, the color dispersion amount becomes substantially linear for wavelength change. In contrast, in the conventional example in which correction as described above is not made, the color dispersion amount increases rapidly in the short wavelength range.

Next, improvement of MTF, a resolution index will be discussed by comparison with conventional readers.

Figure 7:
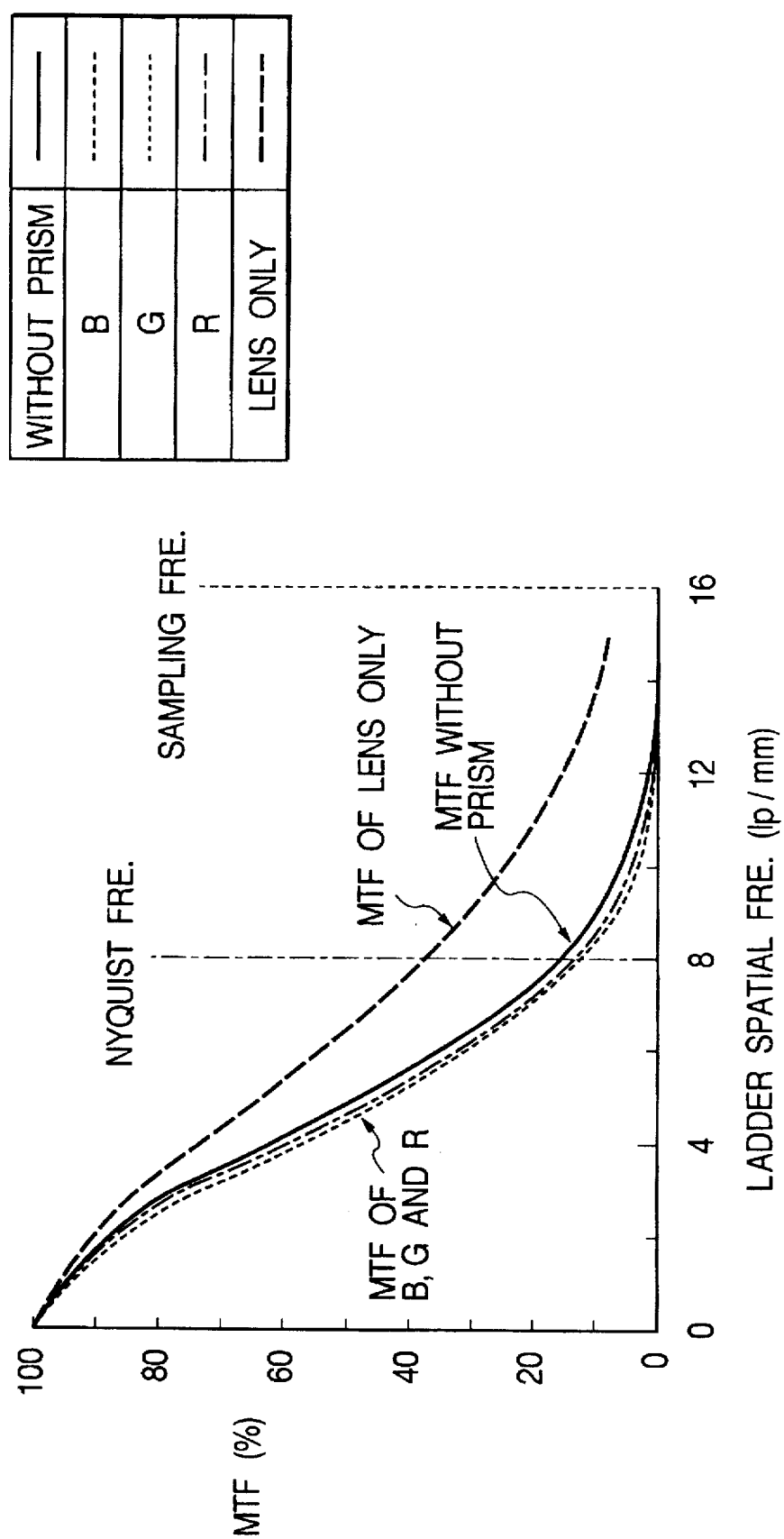
FIG. 7 is a graph showing MTF in the auxiliary scanning direction in the color image reader shown in FIG. 1A.

FIG. 7 is a graph showing MTF in the auxiliary scanning direction at the color image reader of the embodiment; it shows MTF when an image formed by the lens after color dispersion by the prism unit is read by the sensor, for each color light. It also shows MTF with a single lens, namely, MTF when an image of image light is formed by the lens and MTF with no prism, namely, MTF of an image formed by the lens without color dispersion and read by the sensor.

Figure 8:
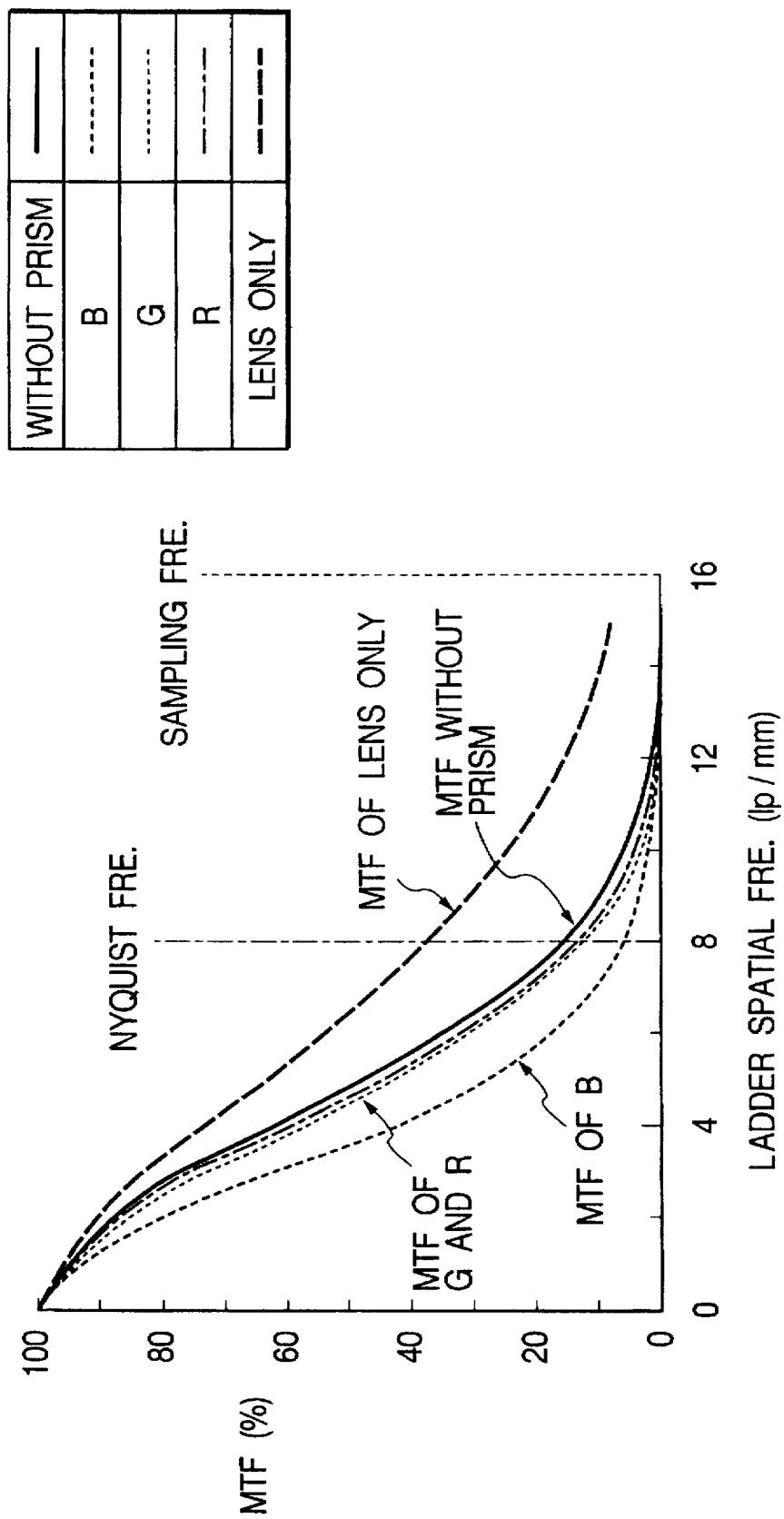
FIG. 8 is a graph showing MTF in the auxiliary scanning direction at a conventional color image reader.

On the other hand, FIG. 8 shows MTF at one of the conventional color image readers.

Generally, MTF lowers as the spatial frequency of a ladder pattern (lp (line pairs)/mm) increases. However, in the conventional example shown in FIG. 8, the MTF of B (blue) remarkably lowers as compared with red (R) and green (G). The MTF of red (R) or green (G) when a ladder pattern of 5 lp/mm used as a read characteristic decision criterion is read lowers only about 10% as compared with the MTF with no prism; that of blue (B) lowers to about a half.

In contrast, as shown in FIG. 7, the color image reader of the embodiment provides almost the same degree of MTF for every color image of red (R), green (G), and blue (B); the MTF lowers about 10% as compared with the MTF with no prism when the ladder pattern of 5 lp/mm is read.

Thus, in the embodiment, partial dispersion in the blue range is reduced, thereby preventing light having a wavelength within spectral response read by the blue (B) sensor line from dispersing in a wide zone and suppressing resolution lowering caused by crosstalk.

Figure 9:
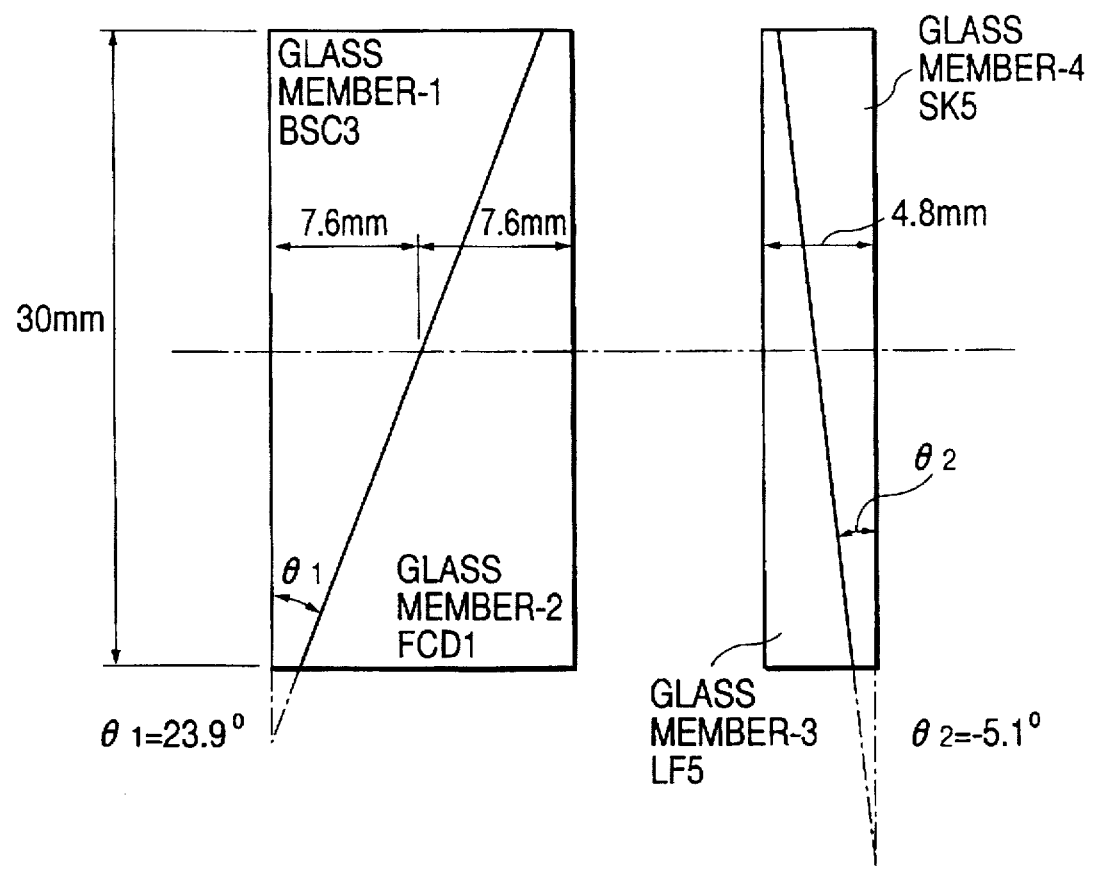
FIG. 9 is a sectional view of the structure of a modified form of the prism unit shown in FIG. 1B.

The embodiment uses the prism unit having four glass members placed so as to be brought into intimate contact with each other. However, as shown in FIG. 9, a similar effect can be produced if a prism unit is used in which each pair of glass member-1 and glass member-2 and glass member-3 and glass member-4 are brought into intimate contact with each other and glass member-2 and glass member-3 are spaced from each other.

[Setting of color dispersion surfaces of prism unit and selection of glass members]

Next, setting of the color dispersion surfaces of the prism unit used in the embodiment and selection of the glass members will be discussed based on the nature of color dispersion by the prism unit.

<<Nature of color dispersion by prism>>

First, the nature of color dispersion by a general prism will be considered.

Figure 10:
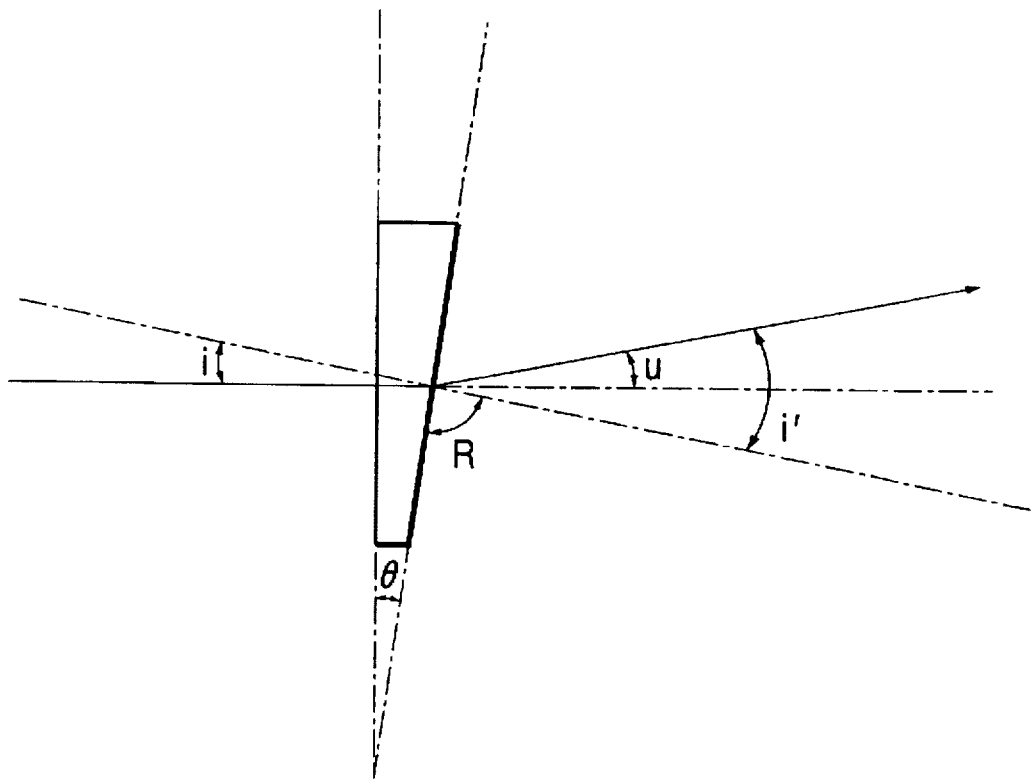
FIG. 10 is an illustration showing a refraction state by a single prism.

When image light is incident vertically to the first face of a prism whose apex angle is θ as shown in FIG. 10, the image position resulting from refraction is as follows:

$n \cdot \sin i = n' \cdot \sin i'$  (Snell's law)
$\theta = i'$  (apex angle = incident angle)
Therefore,
$n \cdot \sin\theta = \sin i'$ The position in the auxiliary scanning direction of the image when the image is formed at a distance of L from the prism is represented by a distance from the optical axis, D, as follows:

$$D = L \cdot \tan u = L \cdot \tan(i' - i) = L \cdot \frac{\sin(i' - i)}{\cos(i' - i)}$$

The image position difference ΔD with respect to two different wavelength lights having wavelengths $\lambda_a$ and $\lambda_b$ is as follows:

$$\begin{aligned}
\Delta D &= L \cdot (\tan u_a - \tan u_b) \quad (1)\\
&= L \left\{ \frac{\sin(i_a' - i_a)}{\cos(i_a' - i_a)} - \frac{\sin(i_b' - i_b)}{\cos(i_b' - i_b)} \right\}\\
&= L \cdot \frac{\sin\{(i_a' - i_a) - (i_b' - i_b)\}}{\cos(i_a' - i_a)\cos(i_b' - i_b)}\\
&= \frac{L}{\cos u_a \cdot \cos u_b} \{\sin(i_a' - i_b')\}\\
&= \frac{L}{\cos u_a \cdot \cos u_b} \{\sin i_a' \cdot \cos i_b' - \cos i_a' \cdot \sin i_b'\}\\
&\approx L \cdot \cos i_a' \cdot \{\sin i_a' - \sin i_b'\}\\
&= L \cdot \cos i_a' \cdot \sin\theta \cdot (n(\lambda_a) - n(\lambda_b))\\
&\propto n(\lambda_a) - n(\lambda_b)
\end{aligned}$$

From Formula (1), it can be considered that the difference between the positions at which the two different wavelength lights form an image is approximately proportional to the refractive index difference $n(\lambda_a) - n(\lambda_b)$ between the two light beams having the different wavelengths.

Considering the above-mentioned four light beams having the typical wavelengths and adopting the image separation distance $\Delta D_{FC}$ between the F-line and C-line beams as the amount defining the color dispersion amount, $$\begin{aligned}
\Delta D_{FC} &\approx L \cdot \cos i_a' \cdot \sin\theta \cdot \{n(\lambda_F) - n(\lambda_C)\}\\
&= L \cdot \cos i_a' \cdot \sin\theta \frac{n(\lambda_d) - 1}{\nu_d} \propto \frac{1}{\nu_d}
\end{aligned}$$

where the Abbe number $\nu_d$ is $$\nu_d = \frac{n(\lambda_d) - 1}{n(\lambda_F) - n(\lambda_C)}.$$

This indicates that the image position interval between the F-line and C-line beams is proportional to the inverse number of the Abbe number. Generally, the magnitude of the inverse of the Abbe number indicates the magnitude of dispersion of the glass member and the image position interval is proportional to the magnitude of dispersion of the glass member.

On the other hand, partial dispersion ratio $P_{gF}$ is available as a preferred parameter showing the nature that dispersion increases rapidly in the blue range:

$$P_{gF} = \frac{n(\lambda_g) - n(\lambda_F)}{n(\lambda_F) - n(\lambda_C)} \quad (2)$$

Since the image position interval between the g-line and F-line beams, namely, the separation distance between the g-line and F-line beams and that between the F-line and C-line beams are approximately proportional to $\{n(\lambda_g)-n(\lambda_F)\}$ and $\{n(\lambda_F)-n(\lambda_C)\}$ respectively, the partial dispersion ratio can be thought as the ratio between the separation distance between the g-line and F-line beams (blue range) and the separation distance between the F-line and C-line beams (range from blue to red), which will be hereinafter referred to as the separation distance ratio.

Therefore, if the value of the partial dispersion ratio shown in Equation (2) increases, the color dispersion in the blue range increases.

<<Nature of color dispersion at interface between combined prisms>>

Figure 11:
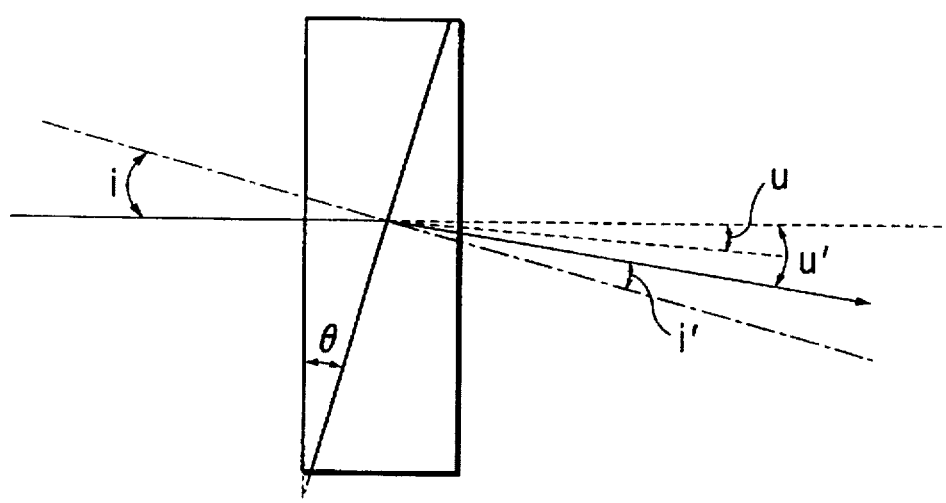
FIG. 11 is an illustration showing a refraction state of a prism unit comprising two glass members in combination as substantially parallel flat glass.

Next, color dispersion by a prism unit using two glass members in combination as shown in FIG. 11 will be discussed.

The prism unit uses two glass members almost the same in refractive index measured with white light and different in Abbe number and has incidence and exit faces set in parallel; the angle between the incidence face and the interface between the two glass members is θ.

If only refraction at the interface between the two glass members of the prism unit is considered, an image formed at a position having a distance L from the prism is distant from the optical axis by L·tan u. In this case, however, the two glass members have almost equal refractive index, thus tan u=u is established by assuming that the refraction amount at the interface is small. Considering refraction at the interface from the prism to air, u is also small, thus $n_2$·sin u=sin u' can be approximated to $n_2$·u=u' and the image position D (distance from the optical axis) at the position distant from the prism by L is expressed as $$D = L \cdot u' = L \cdot n_2 \cdot u = n_2 \cdot L(i' - \theta).$$

Further, by using the relationship $n_1 \sin\theta = n_2 \sin i' \rightarrow n_1 \cdot \theta = n_2 \cdot i'$, the following equation is obtained:

$$D = L \cdot u' = n_2 \cdot L(i' - \theta) = n_2 \cdot L\left(\frac{n_1}{n_2} - 1\right)\theta = L(n_1 - n_2)\theta$$

From the above equation, the image position interval, namely, the image separation distance $\Delta D$ with respect to light beams having two wavelengths $\lambda_a$ and $\lambda_b$, is expressed as $$\begin{aligned}\Delta D &= L \cdot \theta\{n_1(\lambda_a) - n_2(\lambda_a)\} - L \cdot \theta\{n_1(\lambda_b) - n_2(\lambda_b)\} \\ &= L \cdot \theta[\{n_1(\lambda_a) - n_2(\lambda_a)\} - \{n_1(\lambda_b) - n_2(\lambda_b)\}] \\ &= L \cdot \theta[\{n_1(\lambda_a) - n_1(\lambda_b)\} - \{n_2(\lambda_a) - n_2(\lambda_b)\}].\end{aligned}$$

If this is applied to the separation distance between the g-line and F-line beams, $\Delta D_{gF}$ is obtained as $$\begin{aligned}\Delta D_{gF} &= L \cdot \theta[\{n_1(\lambda_g) - n_1(\lambda_F)\} - \{n_2(\lambda_g) - n_2(\lambda_F)\}] \quad (3)\\ &= L \cdot \theta\left[\frac{P_{gF1}\{n_1(\lambda_d) - 1\}}{v_{d1}} - \frac{P_{gF2}\{n_2(\lambda_d) - 1\}}{v_{d2}}\right]\\ &\simeq L \cdot \theta \cdot (n - 1)\left[\frac{P_{gF1}}{v_{d1}} - \frac{P_{gF2}}{v_{d2}}\right]\end{aligned}$$

where Abbe numbers $\lambda_{d1}$ and $\lambda_{d2}$ are $$v_{d1} = \frac{n_1(\lambda_d) - 1}{n_1(\lambda_F) - n_1(\lambda_C)}$$

$$v_{d2} = \frac{n_2(\lambda_d) - 1}{n_2(\lambda_F) - n_2(\lambda_C)}$$

and an assumption $$n_1(\lambda_d) \equiv n_2(\lambda_d) \equiv n$$

is made.

Likewise, if the equation of $\Delta D$ is applied to the separation distance between the F-line and C-line beams, $\Delta D_{FC}$ is obtained as $$\begin{aligned}\Delta D_{FC} &= L \cdot \theta[\{n_1(\lambda_F) - n_1(\lambda_C)\} - \{n_2(\lambda_F) - n_2(\lambda_C)\}] \quad (4)\\ &= L \cdot \theta\left[\frac{\{n_1(\lambda_d) - 1\}}{v_{d1}} - \frac{\{n_2(\lambda_d) - 1\}}{v_{d2}}\right]\\ &\simeq L \cdot \theta(n - 1)\left\{\frac{1}{v_{d1}} - \frac{1}{v_{d2}}\right\}.\end{aligned}$$

From Equation (4), it is seen that the greater the Abbe number difference between the two glass members, the larger the color dispersion amount occurring at the interface between the two glass members.

When the ratio between the separation distance between the g-line and F-line beams and that between the F-line and C-line beams used as an enlargement phenomenon index of color dispersion in the blue wavelength zone, namely, "separation distance ratio" $S_{ep}$ is obtained as follows from Equations (3) and (4):

$$\begin{aligned}S_{ep} &= \frac{\text{separation between g-line and F-line beams}}{\text{separation between F-line and C-line beams}} \quad (5)\\ &= \left\{\frac{P_{gF1}}{v_{d1}} - \frac{P_{gF2}}{v_{d2}}\right\} / \left\{\frac{1}{v_{d1}} - \frac{1}{v_{d2}}\right\}\\ &= \frac{v_{d2} \cdot P_{gF1} - v_{d1} \cdot P_{gF2}}{v_{d2} - v_{d1}}\end{aligned}$$

<<Relationship between glass members and color dispersion nature>>

The above consideration is applied to actual glass members.

If glass members SK5 and LF5 having characteristics as listed in Table 2 make up a prism unit as shown in FIG. 11, the separation distance ratio $S_{ep}$ (approximately equal to the partial dispersion ratio) is $$\frac{\text{separation between g-line and F-line beams}}{\text{separation between F-line and C-line beams}} = S_{ep} \simeq 0.64.$$

TABLE 2

|  | $n(\lambda_d)$ | $v_d$ | $P_{gF}$ |
|---|---|---|---|
| SK5 | 1.581 | 61.4 | 0.540 |
| LF5 | 1.589 | 40.9 | 0.575 |

The value of the separation distance ratio $S_{ep}$ is greater than the separation distance ratio of the single prism (approximately equal to the partial dispersion ratio $D_{gF}$). The reason why the former value is greater than the latter is as follows:

Equation (5) is modified into $$\frac{v_{d2} \cdot P_{gF1} - v_{d1} \cdot P_{gF2}}{v_{d2} - v_{d1}} = P_{gF1} + \frac{v_{d1} \cdot (P_{gF1} - P_{gF2})}{v_{d2} - v_{d1}}. \quad (6)$$

Figure 12:
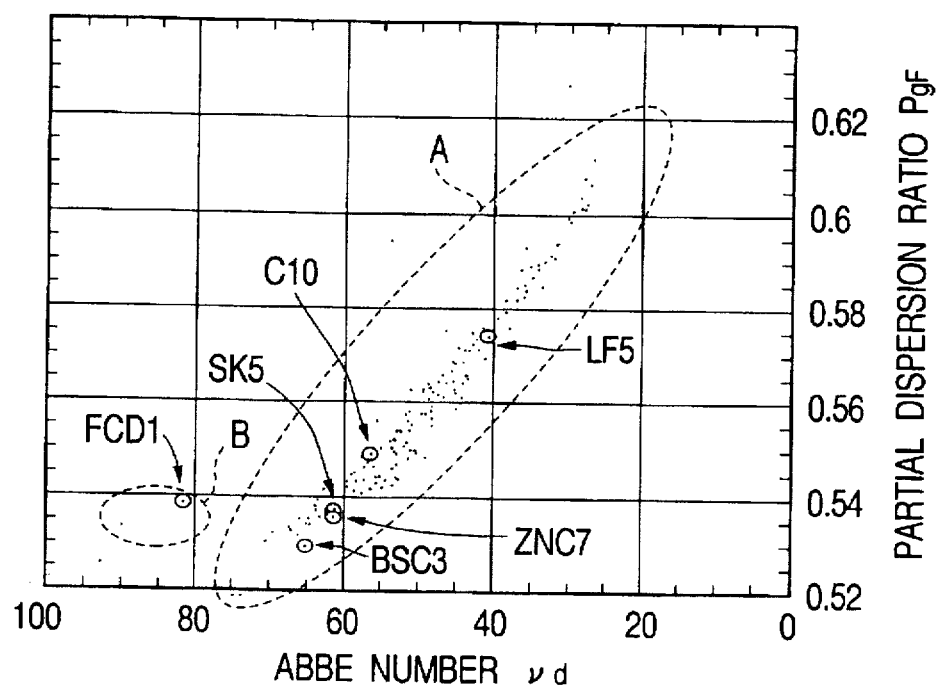
FIG. 12 is a graph showing the relationship between Abbe numbers and partial dispersion ratios of glass members.

For general glass members, the less the Abbe number, the larger the partial dispersion ratio, as shown in FIG. 12. The glass members SK5 and LF5 used for the prism are also contained in "standard glass members" shown in FIG. 12, and the partial dispersion ratio of LF5 whose Abbe number is less than the Abbe number of SK5, PgF, is larger than the partial dispersion ratio of SK5. Therefore, the denominator and numerator of the second term on the right side of Equation (6) have the same sign and the second term becomes a positive value. Thus, the partial dispersion ratio of the prism unit having two overlaid glass members, $P_{gF}$, is larger than that of the single prism.

On the other hand, to lessen the partial dispersion ratio from Equation (6), glass members may be selected so that the value of the second term on the right side of Equation (6) becomes negative; the denominator and numerator of the second term may differ in sign. Thus, two glass members must be selected so that one of the two glass members has greater Abbe number and larger partial dispersion ratio than the other. General glass falls into the range as shown as standard glass members A in FIG. 12, wherein the less the Abbe number, the larger the partial dispersion ratio, and cannot be selected so as to satisfy the condition. If glass members belonging to the group called "abnormal dispersion glass" (glass members in the range B shown in FIG. 12) having characteristics outside the range A are used, it is considered that the partial dispersion ratio can be decreased.

Color dispersion by a prism unit using two overlaid glass members of FCD1 belonging the group and BSC3 having an almost equal refractive index to that of FCD1 is shown.

Table 3 lists the characteristics of the glass members. The separation distance ratio $S_{ep}$ is $$\frac{\text{separation between g-line and F-line beams}}{\text{separation between F-line and C-line beams}} \approx S_{ep} \approx 0.49$$

TABLE 3

|      | $n(\lambda_d)$ | $V_d$ | $P_{dF}$ |
|------|----------------|-------|----------|
| FCD1 | 1.497          | 81.6  | 0.539    |
| BSC3 | 1.498          | 65.1  | 0.529    |

Thus, abnormal dispersion glass can be used to slightly lessen the value of $S_{ep}$, but the partial dispersion ratio difference between the two glass members is small and the effect of greatly improving the separation distance ratio cannot be produced.

<<Nature of color dispersion when four color dispersion surfaces are combined>>

Here, means for improving the separation distance ratio will be discussed, wherein a first prism having a nature of increasing the separation distance ratio and a second prism with a smaller separation distance ratio than the first prism are overlaid on each other and color lights resulting from color dispersion by the first prism are refracted in the opposite direction by the second prism for correcting color dispersion characteristics.

Figure 13:
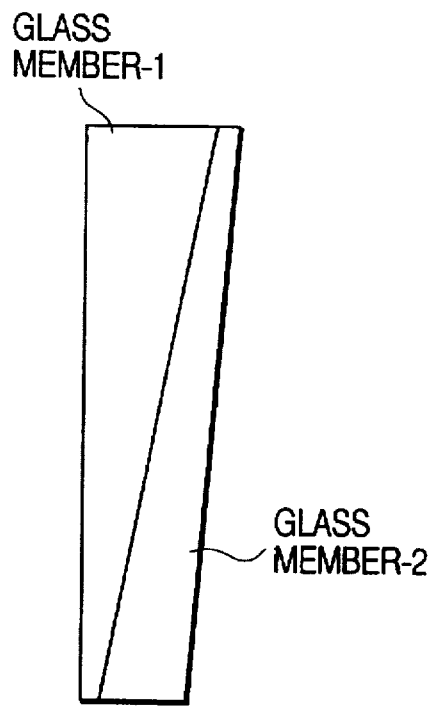
FIG. 13 is an illustration showing a general example of a prism unit comprising two glass members in combination.
Figure 14:
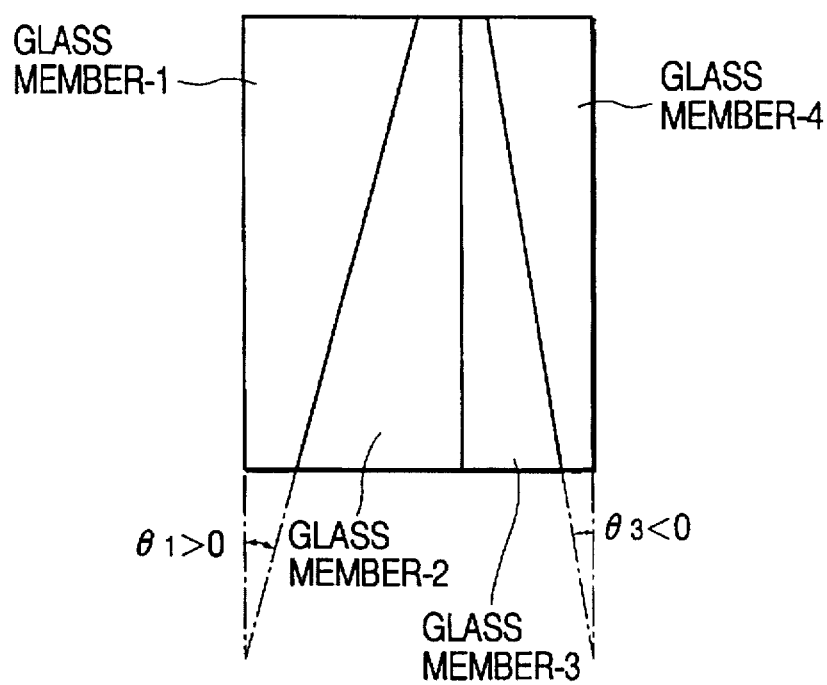
FIG. 14 is an illustration showing the form of a prism unit comprising four glass members in combination as substantially parallel flat glass as a whole.

With single prisms used as the first and second prisms of the means, the first prism having a large refractive index and being comparatively small in partial dispersion and the second prism having a small refractive index and being large in partial dispersion can also be combined as shown in FIG. 13. However, this structure does not meet the condition that the entire prism unit becomes an optical plane because the refractive power of the two prisms is adjusted so as to optimize partial dispersion. Thus, when it is inserted in a read optical system, another aberration such as astigmatism is produced. Then, as shown in FIG. 14, a prism unit comprising two pairs of overlaid prisms as substantially parallel flat glass as shown in FIG. 11 in combination will be discussed as means for improving the separation distance ratio without producing the astigmatism. Glass member-1 and glass member-2 of the prism unit are selected so as to provide a color dispersion characteristic having a small separation distance ratio at the interface therebetween, and glass member-3 and glass member-4 are selected so as to provide a color dispersion characteristic having a large separation distance ratio.

Since such a prism unit has approximately a characteristic resulting from totalizing the characteristics of the two pairs of overlaid prisms, the image position difference $\Delta D$ with respect to two wavelengths $\lambda_a$ and $\lambda_b$ becomes the sum of the image position difference caused by dispersion at the interface between glass member-1 and glass member-2 and that caused by dispersion at the interface between glass member-3 and glass member-4.

Therefore, $$\begin{aligned}
\Delta D &= L[\{n_1(\lambda_a) - n_2(\lambda_a)\}\theta_1 + \{n_3(\lambda_a) - n_4(\lambda_a)\}\theta_3] - \\
&\quad L[\{n_1(\lambda_b) - n_2(\lambda_b)\}\theta_1 + \{n_3(\lambda_b) - n_4(\lambda_b)\}\theta_3] \\
&= L[\theta_1[\{n_1(\lambda_a) - n_1(\lambda_b)\} - \{n_2(\lambda_a) - n_2(\lambda_b)\}] + \\
&\quad \theta_3[\{n_3(\lambda_a) - n_3(\lambda_b)\} - \{n_4(\lambda_a) - n_4(\lambda_b)\}]]
\end{aligned}$$

If this is applied to the separation distance between the g-line and F-line beams, the separation distance between the g-line and F-line beams, $\Delta D_{gF}$ is obtained as follows:

$$\begin{aligned}
\Delta D_{gF} &= L[\theta_1[\{n_1(\lambda_g) - n_1(\lambda_F)\} - \{n_2(\lambda_g) - n_2(\lambda_F)\}] + \\
&\quad \theta_3[\{n_3(\lambda_g) - n_3(\lambda_F)\} - \{n_4(\lambda_g) - n_4(\lambda_F)\}]] \\
&= L\left[\theta_1\left\{\frac{P_{gF1}\{n_1(\lambda_d) - 1\}}{V_{d1}} - \frac{P_{gF2}\{n_2(\lambda_d) - 1\}}{V_{d2}}\right\} + \right. \\
&\quad \left. \theta_3\left\{\frac{P_{gF3}\{n_3(\lambda_d) - 1\}}{V_{d3}} - \frac{P_{gF4}\{n_4(\lambda_d) - 1\}}{V_{d4}}\right\}\right] \\
&\approx L\left[\theta_1(n_1 - 1)\left\{\frac{P_{gF1}}{V_{d1}} - \frac{P_{gF2}}{V_{d2}}\right\} + \right. \\
&\quad \left. \theta_3(n_3 - 1)\left\{\frac{P_{gF3}}{V_{d3}} - \frac{P_{gF4}}{V_{d4}}\right\}\right]
\end{aligned}$$

Likewise, if it is applied to the separation distance between the F-line and C-line beams, the separation distance between the F-line and C-line beams, $\Delta D_{FC}$ is obtained as follows:

$$\begin{aligned}
\Delta D_{FC} &= L[\theta_1[\{n_1(\lambda_F) - n_1(\lambda_C)\} - \{n_2(\lambda_F) - n_2(\lambda_C)\}] + \\
&\quad \theta_3[\{n_3(\lambda_F) - n_3(\lambda_C)\} - \{n_4(\lambda_F) - n_4(\lambda_C)\}]] \\
&= L\left[\theta_1\left\{\frac{\{n_1(\lambda_d) - 1\}}{V_{d1}} - \frac{\{n_2(\lambda_d) - 1\}}{V_{d2}}\right\} + \right. \\
&\quad \left. \theta_3\left\{\frac{\{n_3(\lambda_d) - 1\}}{V_{d3}} - \frac{\{n_4(\lambda_d) - 1\}}{V_{d4}}\right\}\right] \\
&\approx L\left[\theta_1(n_1 - 1)\left\{\frac{1}{V_{d1}} - \frac{1}{V_{d2}}\right\} + \right. \\
&\quad \left. \theta_3(n_3 - 1)\left\{\frac{1}{V_{d3}} - \frac{1}{V_{d4}}\right\}\right]
\end{aligned}$$

Now, the following substitutions are made:

$$\frac{1}{N_A} = (n_1 - 1)\left\{\frac{1}{V_{d1}} - \frac{1}{V_{d2}}\right\}$$

$$\frac{1}{N_B} = (n_3 - 1)\left\{\frac{1}{V_{d3}} - \frac{1}{V_{d4}}\right\}$$

$$S_{epA} = \left\{\frac{P_{gF1}}{V_{d1}} - \frac{P_{gF2}}{V_{d2}}\right\} / \left\{\frac{1}{V_{d1}} - \frac{1}{V_{d2}}\right\}$$

$$\rightarrow \frac{S_{epA}}{N_A} = (n_1 - 1)\left\{\frac{P_{gF1}}{V_{d1}} - \frac{P_{gF2}}{V_{d2}}\right\}$$

$$S_{epB} = \left\{\frac{P_{gF3}}{V_{d3}} - \frac{P_{gF4}}{V_{d4}}\right\} / \left\{\frac{1}{V_{d3}} - \frac{1}{V_{d4}}\right\}$$

$$\rightarrow \frac{S_{epB}}{N_B} = (n_3 - 1)\left\{\frac{P_{gF3}}{V_{d3}} - \frac{P_{gF4}}{V_{d4}}\right\}$$

Thus, we obtain (separation between g-line and F-line beams)/$L =$ (7)

$$\Delta_{gF} = \theta_1\frac{S_{epA}}{N_A} + \theta_3\frac{S_{epB}}{N_B}$$

(separation between F-line and C-line beams)/$L =$ (8)

$$\Delta_{FC} = \theta_1\frac{1}{N_A} + \theta_3\frac{1}{N_B}$$

where $1/N$ and $S_{ep}$ denote dispersion and partial dispersion ratio as the combined prism unit.

<<Glass member selection and interface setting>>

To determine the dimensions and interfaces in design of such a prism unit, first the glass members are determined, whereby $S_{epA}$, $S_{epB}$, $N_A$, and $N_B$ are determined, and $\theta_1$ and $\theta_3$ are determined so that the "separation distance between F-line and C-line beams" and the "separation distance between g-line and F-line beams" become target values. As schematic design, if $\Delta_{gF}$, $\Delta_{FC}$, $S_{epA}$, $S_{epB}$, $N_A$, and $N_B$ are determined, $\theta_1$ and $\theta_3$ are found from Equations (7) and (8).

At the time, to operate the two prism pairs so as to negate the characteristics of the prisms, the prism unit become thick. Thus, the glass members need to be selected so that the prism unit can be made as thin as possible.

If the color dispersion characteristic with small "separation distance ratio" $S_{ep}$ is assigned to the front prism pair (parameters $S_{epA}$ and $N_A$) and the color dispersion characteristic with large "separation distance ratio" $S_{ep}$ is assigned to the rear prism pair (parameters $S_{epB}$ and $N_B$), since the prism pair having the color dispersion characteristic with large "separation distance ratio" $S_{ep}$ provides large color dispersion as the glass members themselves, the angle of the glass member interface adjusting the color dispersion production amount, $\theta_3$, may be small as compared with $\theta_1$. Thus, how $\theta_1$ is made a small angle becomes a problem.

To consider the condition for reducing the value of $\theta_1$, $\theta_1$ is obtained as follows from Equations (7) and (8):

$$\theta_1 = \frac{N_A \left\{ \Delta_{FC} - \frac{\Delta_{gF}}{S_{epB}} \right\}}{\left\{ 1 - \frac{S_{epA}}{S_{epB}} \right\}} \quad (9)$$

Considering a specific prism unit from Equation (9), the glass members of the rear prism pair should have a large color dispersion amount and a large partial dispersion ratio at the interface between the two glass members. Glass members having almost the same refractive index may be selected from among the standard glass members having the characteristics surrounded by the broken line A in FIG. 12; they can be selected comparatively as desired and a pair of SK5 and LF5 is selected as a general combination. The characteristics of the glass members are as listed in Table 2. $S_{epB}$ and $N_B$ are obtained as follows from the values in Table 2 with glass member-3 and glass member-4 selected as LF5 and SK5, respectively:

$N_B$=209, $S_{ep}$=0.64

Unless $S_{epA}$ is made sufficiently small as compared with $S_{epB}$ as the front prism pair, the denominator on the right side of Equation (9) approaches 0 and $\theta_1$ becomes large. Thus, the two glass members are selected as a combination containing abnormal dispersion glass (glass members having the characteristics surrounded by the broken line B in FIG. 12) as described above for lessening the "separation distance ratio" $S_{epA}$.

However, since a few types of abnormal dispersion glass are available, freedom of selection is substantially limited to selecting the glass member FCD1.

Figure 15:
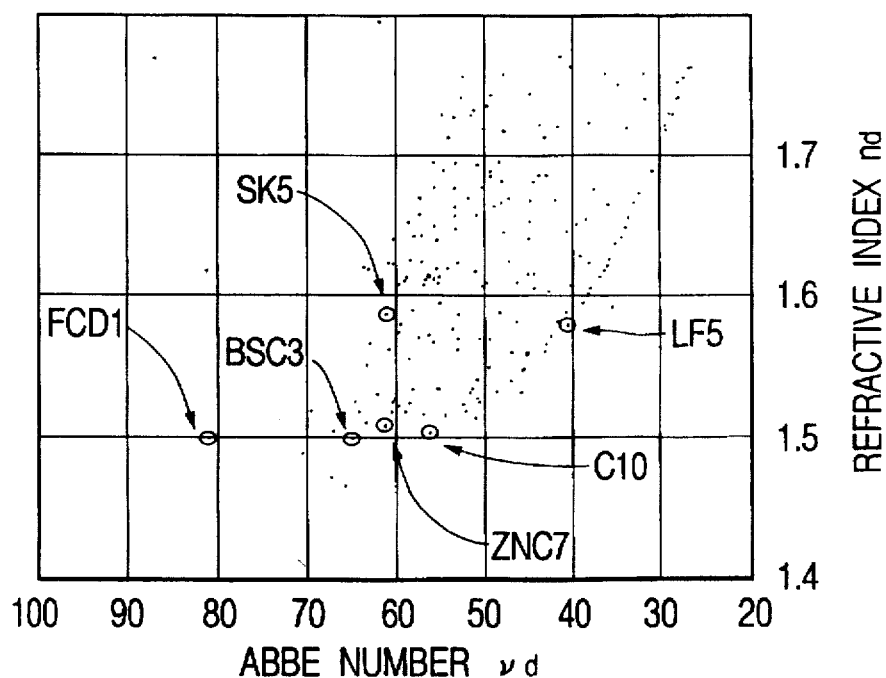
FIG. 15 is a graph showing the relationship between Abbe numbers and refractive indexes of glass members.

On the other hand, BSC3, ZNC7, and C10 shown in FIG. 15 are possible as glass members having a refractive index of about 1.50 combined with the abnormal dispersion glass. Whether or not they are proper will be discussed.

The parameters varying depending on whether any of the three glass members is selected in Equation (9) for determining $\theta_1$ are only $S_{epA}$ and $N_A$; $\theta_1$ can be made small by lessening $S_{epA}$ ($<S_{epB}$) or $N_A$.

The three glass members have a nature that partial dispersion increases as the Abbe number lessens in the order of BSC3→ZNC7→C10. Thus, the total dispersion ($1/N_A$) and partial dispersion ratio ($S_{epA}$) in combination with FCD1 increase in the order of BSC3→ZNC7→C10.

Table 4 lists the characteristic values $S_{epA}$ and $N_A$ and the values of $N_A/\{1-S_{epA}/S_{epB}\}$ varying depending on the values for the three glass members.

TABLE 4

| | $n(\lambda_d)$ | $\nu_d$ | $P_{gF}$ | $N_A$ | $S_{epA}$ | $N_A/(1 - S_{epA}/S_{epB})$ |
|---|---|---|---|---|---|---|
| FCD1 | 1.497 | 81.6 | 0.539 | — | — | — |
| BSC3 | 1.498 | 65.1 | 0.529 | 1323 | 0.49 | 5645 |
| ZNC7 | 1.508 | 61.3 | 0.536 | 930 | 0.53 | 5411 |
| C10 | 1.501 | 56.3 | 0.550 | 633 | 0.57 | 5787 |

As listed in Table 4, the value of $N_A/\{1-S_{epA}/S_{epB}\}$ becomes the minimum when ZNC7 is used. Results of an experiment of comparing and checking it by actual ray tracing is described below.

Figure 16:
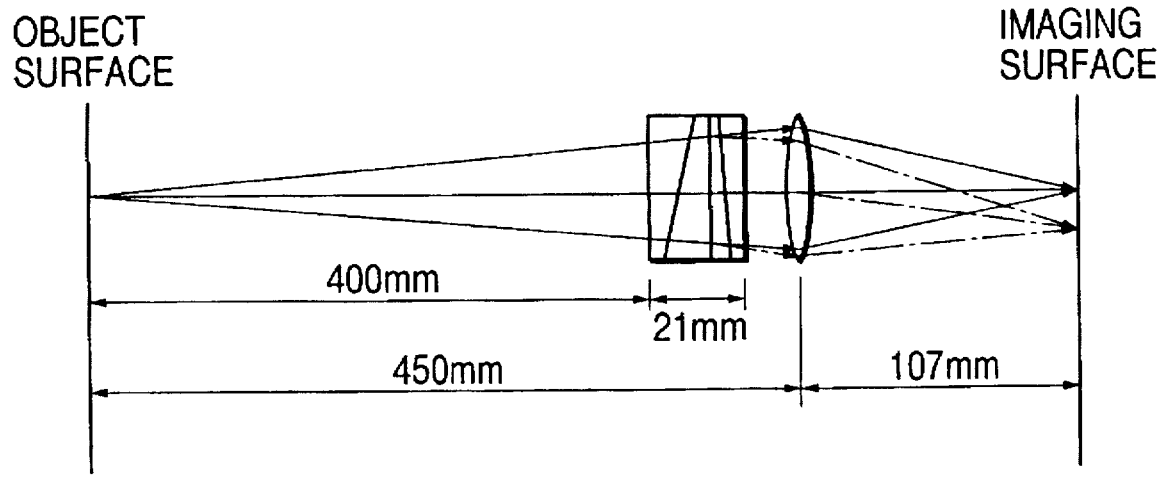
FIG. 16 is an illustration showing optical paths in an experimental arrangement to check the effect of the invention.

As ray tracing conditions, an ideal lens is used and the lens and prism unit are placed and the image separation distance caused by the wavelength difference on the image formation surface is measured, as shown in FIG. 16.

Figure 17:
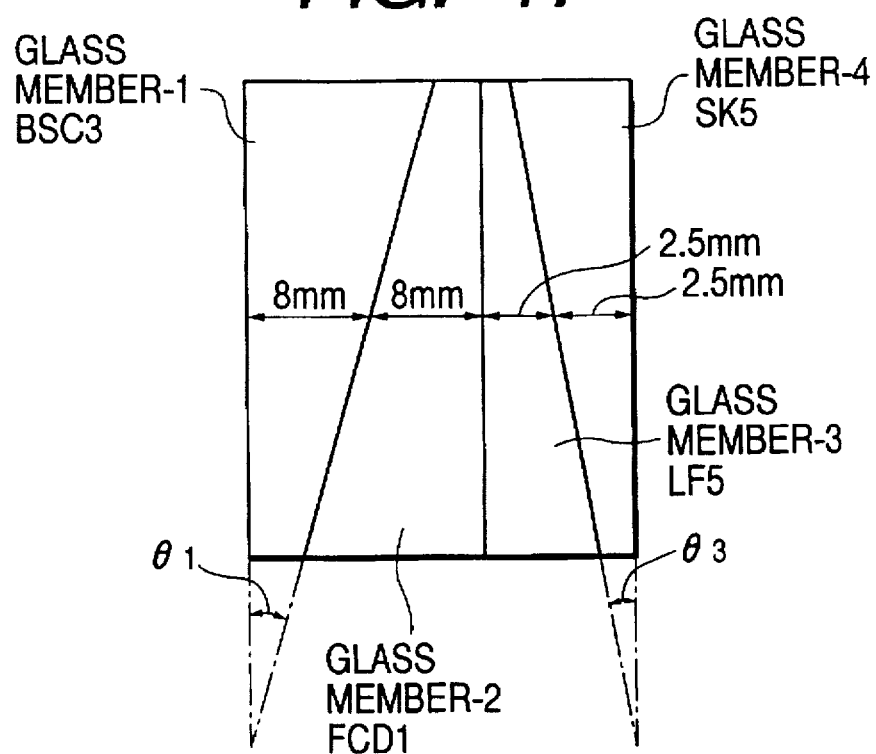
FIG. 17 is an illustration showing the structure of a prism unit used in the experimental arrangement shown in FIG. 16.

The prism unit dimensions are as shown in FIG. 17 and the three glass members BSC3, ZNC7, and C10 are compared for glass member-1 and $\theta_1$ and $\theta_3$ are changed as parameters.

Figure 18:
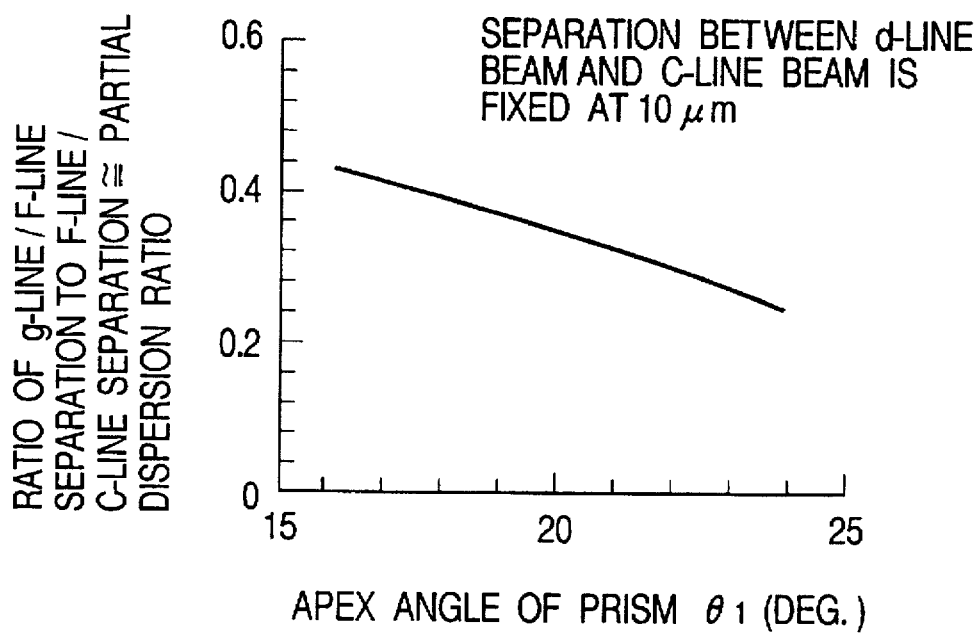
FIG. 18 is a graph showing the relationship between the apex angle of the prism unit, $\theta_1$, and the "ratio between the separation distance between g-line and F-line beams and that between F-line and C-line beams" as the result of an experiment executed using the arrangement shown in FIG. 16.

First, with BSC3 as glass member-1, the apex angle of the front prism pair, $\theta_1$, is changed and $\theta_3$ is changed following $\theta_1$ so that the "separation distance between d-line beam (588 nm) and C-line beam (656 nm)" becomes constant at 10 μm. FIG. 18 shows partial dispersion change in the blue range at the time. The "ratio between the separation distance between g-line and F-line beams and that between F-line and C-line beams" is used as the partial dispersion change in the blue range.

From the figure, the apex angle of the rear prism pair, $\theta_3$, increases by increasing the apex angle of the front prism pair, $\theta_1$, while the "separation distance between d-line beam (588 nm) and C-line beam (656 nm)" is held constant. Accompanying this, the correction amount of partial dispersion also increases and the partial dispersion in the blue range lessens.

Figure 19:
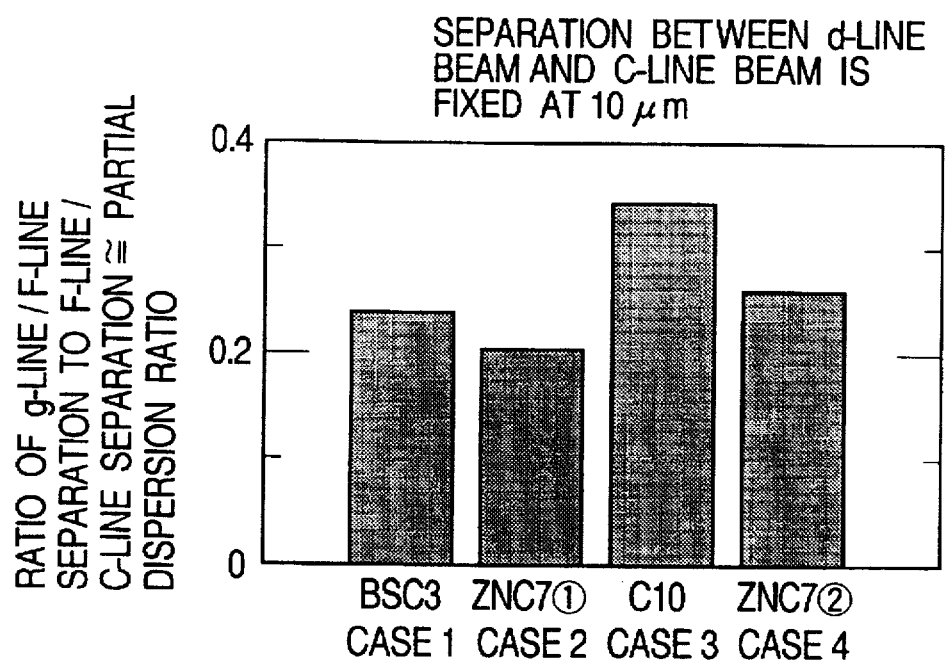
FIG. 19 is a graph showing the relationship between the types of first glass member and the "ratio between the separation distance between g-line and F-line beams and that between F-line and C-line beams" as the result of an experiment executed using the arrangement shown in FIG. 16.

FIG. 19 shows the "ratio between the separation distance between g-line and F-line beams and that between F-line and C-line beams" as CASE 1, CASE 2, and CASE 3 when SC3, ZNC7, and C10 are used as glass member-1 if a condition of $\theta_1$=24 degrees is selected as the comparison basis with other glass members. CASE 4 is the result when ZNC7 is used as glass member-1 with $\theta_1$=22 degrees.

According to the figure, C10 is bad and BSC3 and ZNC7 show the similar result; ZNC7 is slightly better than BSC3, supporting the result in Table 4. However, the difference between ZNC7 and BSC3 is slight and CASE 4 in which the apex angle $\theta_1$ is set at 22 degrees using ZNC7 shows partial dispersion worse than CASE 1 using BSC3.

From the result, it can be considered that BSC3 or ZNC7 is preferred as the glass member combined with FCD1 which is "abnormal dispersion glass."

Therefore, the structure of the prism unit used in the first embodiment as shown in FIG. 1B can be adopted as one of preferred prism units.

Second Embodiment

Next, a color image reader according to a second embodiment of the invention will be discussed.

Figure 20:
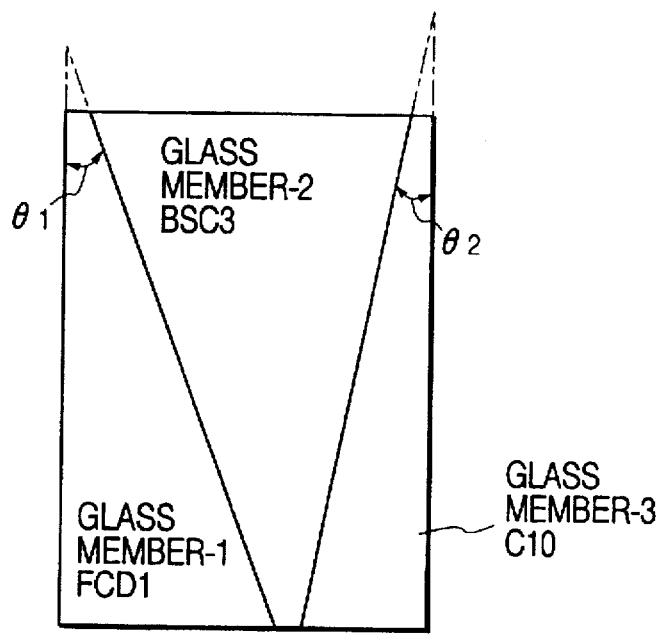
FIG. 20 is a sectional view showing the structure of a prism unit used in a color image reader according to a second embodiment of the invention.

The second embodiment uses a prism unit comprising three glass members in combination as shown in FIG. 20 in place of the prism unit shown in FIG. 1B. Other components such as a lamp, mirrors, a lens, and an image sensor are identical with those of the first embodiment shown in FIG. 1A.

The prism unit uses three glass members which are almost the same in refractive index for white light; it uses FDC1 as glass member-1, BSC3 as glass member-2, and C10 as glass member-3. The characteristics of the glass members are as listed in Table 4.

The prism unit is set so that the interface between glass member-1 and glass member-2 forms the first color dispersion surface and the interface between glass member-2 and glass-member-3 forms the second color dispersion surface, producing color separation in the opposite direction to the optical axis.

The incident face of glass member-1 and the exit face of glass member-3 are parallel, forming substantially parallel flat glass as the entire prism unit. Such a prism unit can be thought as a prism unit integrally molded using the same for glass member-2 and glass member-3 of the prism unit shown in FIG. 14. The Abbe number and partial dispersion ratio of the glass member-2 (BSC3) are smaller than those of the glass member-1 (FDC1); the separation distance ratio (approximately equal to the partial dispersion ratio) depending on the interface therebetween lessens. On the other hand, the glass member-3 (C10) having a smaller Abbe number has a larger partial dispersion ratio than the glass member-2 (BSC3); the separation distance ratio depending on the interface therebetween increases.

Figure 21:
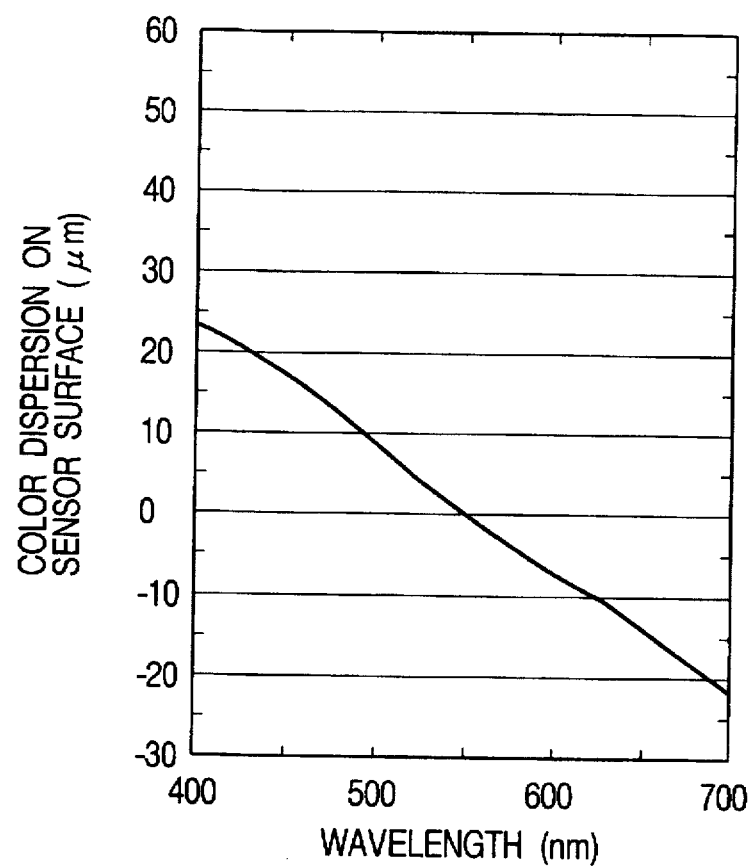
FIG. 21 is a graph showing the relationship between the wavelength of light whose color is dispersed by the prism unit shown in FIG. 20 and the color dispersion amount on a sensor surface.

Therefore, when image light is incident on the prism unit, color dispersion is produced on the first color dispersion surface and color dispersion of each color light is produced on the second color dispersion surface in the opposite direction to the first color dispersion surface. However, the characteristic that partial dispersion in the blue range of color dispersion produced on the first color dispersion surface becomes large is corrected by means of the second color dispersion surface, and the color dispersion amount on the sensor surface, namely, the distribution of separation distances of images of wavelengths from the optical axis becomes substantially linear as shown in FIG. 21. Thus, red (R), green (G), and blue (B) images formed on the sensor surface by the lens are separated almost equally from each other and the resultant color image can be read by the image sensor as shown in FIG. 3.

Although the embodiment provides a simple structure by using three glass members, the Abbe number difference between glass member-2 (BSC3) and glass member-3 (C10) becomes small and it becomes necessary to increase the angle of the interface between the glass members, $\theta_3$, thus the prism unit is slightly thick.

Third Embodiment

Next, a third embodiment of the invention will be discussed.

Unlike the first or second embodiment, a color image reader according to the third embodiment comprises one color dispersion means, which is made up of two adjacent lenses in intimate contact with each other. The center of curvature of the curved surface as the interface between the two lenses is decentered in the auxiliary scanning direction, thereby producing color dispersion in the auxiliary scanning direction.

Figure 22A:
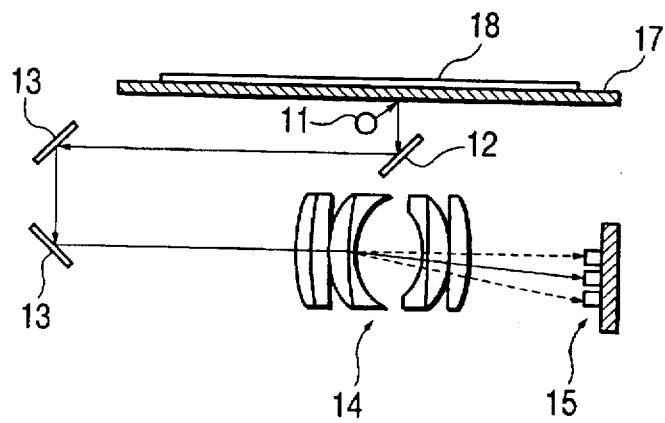
FIGS. 22A and 22B are a schematic drawing showing the configuration of a color image reader according to a third embodiment of the invention and a sectional view showing the structure of a lens unit used in the color image reader.
Figure 22B:
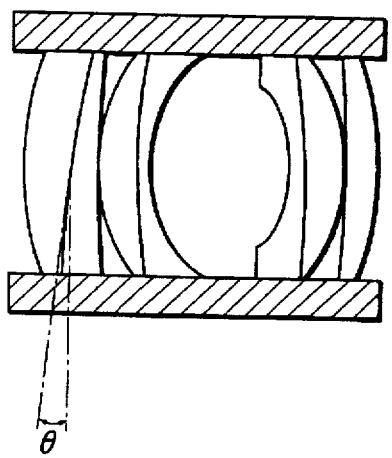

FIGS. 22A and 22B are a schematic drawing showing the configuration of the color image reader and a sectional view showing the structure of the lens unit used in the color image reader.

As shown in FIG. 22A, the color image reader has a lamp 11 running for exposing a document 18 on platen glass 17, a full-rate mirror 12 running with the lamp 11, half-rate mirrors 13 running at half the rate of the lamp 11 and the full-rate mirror 12, a lens unit 14 for forming an image of image light, and a CCD image sensor 15 for converting incident light into an electric image signal.

The full-rate mirror 12 is placed so as to guide image light reflected on the document surface into the half-rate mirror 13 and the half-rate mirrors 13 and 13 run in the same direction at half the rate of the full-rate mirror 12 for holding the optical path length constant.

Figure 23:
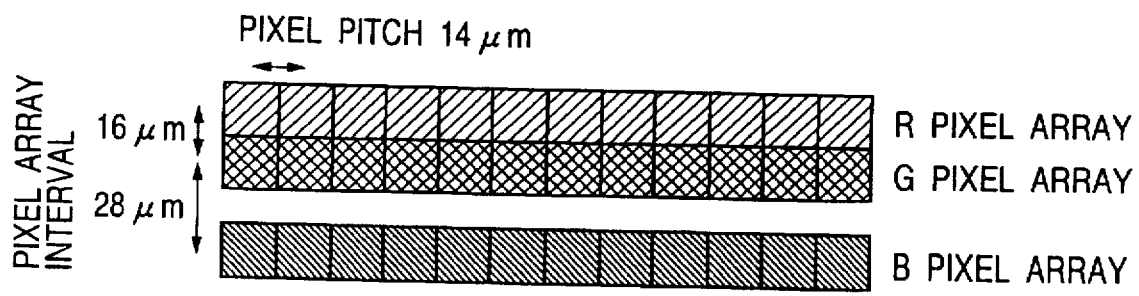
FIG. 23 is an illustration showing the arrangement of photosensitive elements of a line image sensor used in the color image reader shown in FIG. 22A.

The line image sensor 15 comprises three read lines placed in the auxiliary scanning direction each consisting of a large number of devices arranged in the main scanning direction, as shown in FIG. 23. The lines are red (R), green (G), and blue (B) read lines provided by filters from the optical path side. The line image sensor 15 produces color dispersion of image light from the same line on a document and reads light of each color; the R and G device lines are 16 μm spaced from each other and the G and B device lines are 28 μm spaced from each other as the blue color dispersion amount increases.

The lens unit 14 comprises seven lenses in combination as shown in FIG. 22B; each pair of the first and second lenses, the third and fourth lenses, and the fifth and sixth lenses are laminated lenses that are in close contact. The employment of the combination lenses is to correct the five Seidel aberrations and the chromatic aberration. Low-dispersion and high-dispersion glass members are used in combination.

The lens unit 14 has an image formation magnification of 0.22 and forms an image of image light from a document on the sensor with the photosensitive element pitch 14 μm, thus reads an original image at a resolution of 400 dpi.

Figure 24:
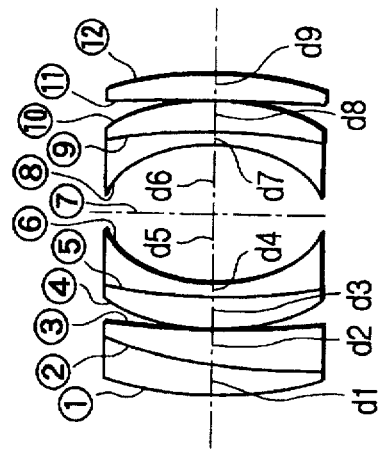
FIG. 24 is an illustration showing the structure of a lens unit used in the color image reader shown in FIG. 22A and a table listing the lens surface curvatures, surface spacing, and refractive indexes and Abbe numbers of glass members making up the lens unit.

FIG. 24 shows the radius of curvature (r) of and the surface spacing (d) between the lens surfaces making up the lens unit 14 and the refractive index (n) and Abbe number (ν) of each of glass members as lenses.

The Abbe number ν is represented by the following equation considering the following three light beams having the typical wavelengths:

$\nu = \{n(\lambda_d)-1\}/\{n(\lambda_F)-n(\lambda_C)\}$

Figure 25:
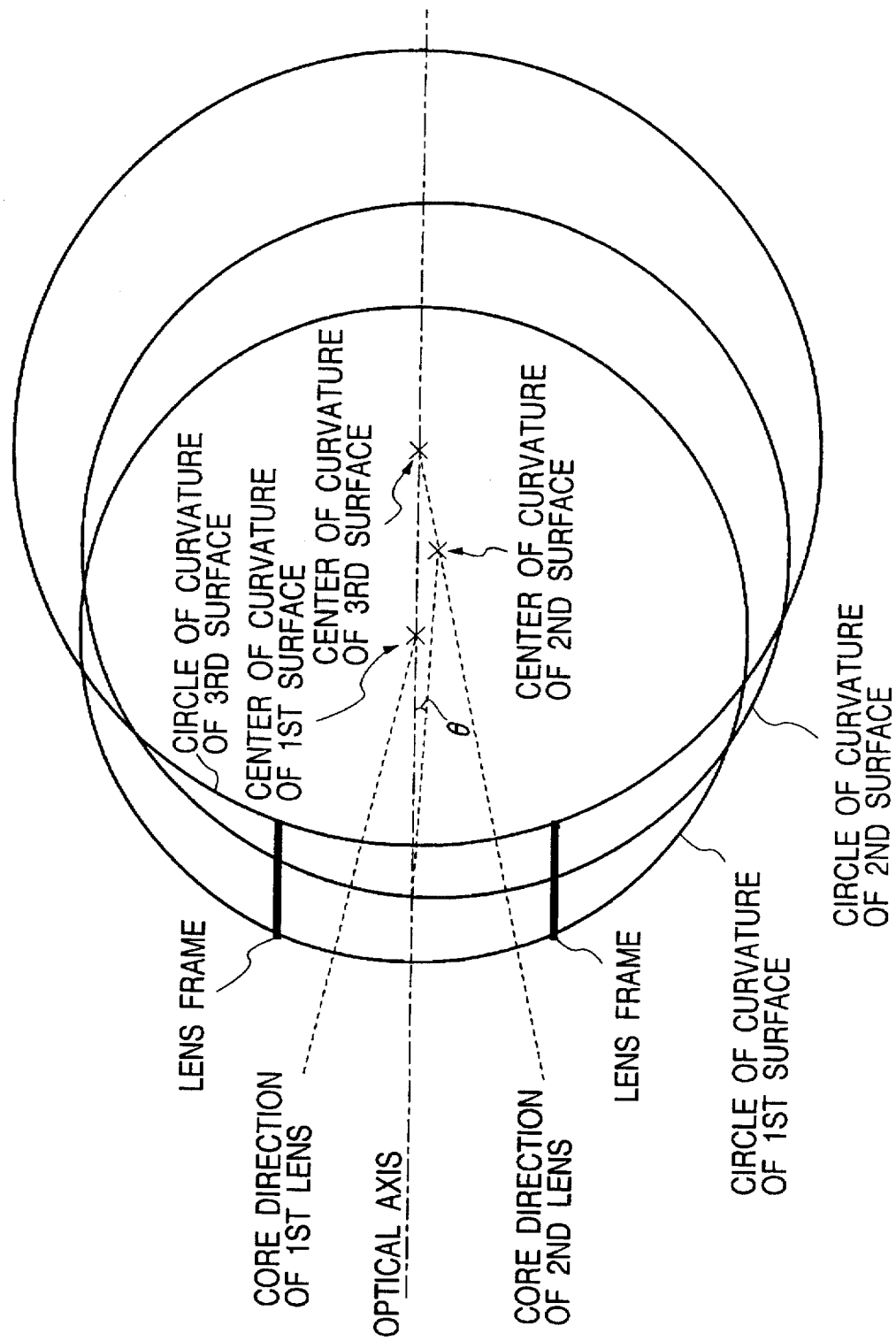
FIG. 25 is an illustration showing the structure of decentered interfaces of the lens unit shown in FIG. 22B.

C-line beam: wavelength $\lambda_C$=656.3 nm d-line beam: wavelength $\lambda_d$=587.6 nm F-line beam: wavelength $\lambda_F$=486.1 nm At the lens unit having the structure, the center of curvature of the second surface is 1.5°-decentered to the lower side of the auxiliary scanning direction. This is a state in which the center of curvature of the lens surface is at a position of decentering angle θ=1.5° from the optical axis, as shown in FIG. 25. This means that the second surface is inclined to the auxiliary scanning direction by θ=1.5° on the optical axis.

Figure 26:
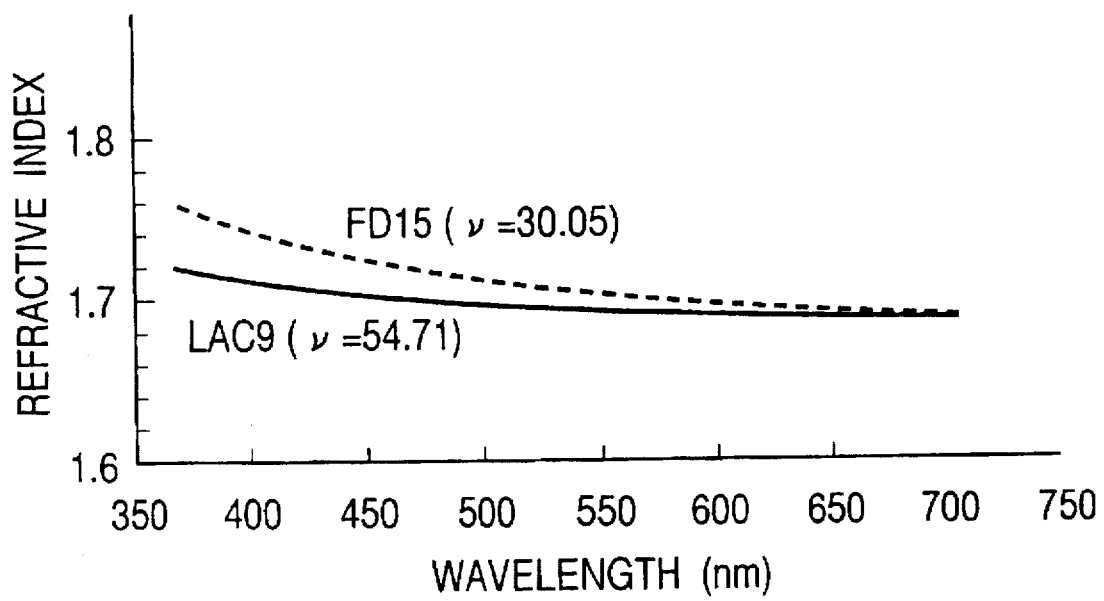
FIG. 26 is a graph showing the relationship between light wavelengths and refractive indexes of glass members used in the lens unit shown in FIG. 22B.

The glass members of the first and second lenses with the second surface as the interface therebetween are FD15 and LAC9, the refractive indexes of which are values substantially equal to $n_1$=1.6910 and $n_2$=1.6989. Thus, image light travels substantially in a straight line as a whole. However, the Abbe numbers of the glass members greatly differ as $\nu_1$=54.71 and $\nu_2$=30.05 and color dispersion is produced because the interface therebetween, namely, the second surface is inclined. FIG. 26 shows the distribution of refractive indexes for light of each wavelength in the two glass members.

Figure 27:
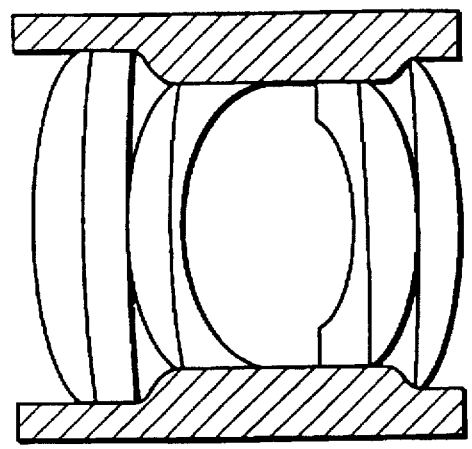
FIG. 27 is a sectional view showing the lens unit shown in FIG. 22B.

Assume that the optical axis direction of the lens unit is a Z direction, that the photosensitive element arrangement direction (main scanning direction) is an X direction, and that the direction at right angles to the X direction is a Y direction. On the XZ plane, the lens outer form is made large at the front and rear of the optical axis and the outer diameter in the intermediate part is made small, as shown in FIG. 27, to deal with image light of half view angle 18.7° incident from both ends of the main scanning direction, namely, both sides of the original image.

On the other hand, on the YZ plane, the image of image light needs only to be formed from only one scanning line on an original document and the upper and lower parts of the lenses are not required and can be truncated. Thus truncating the upper and lower parts of the lenses also makes it possible to avoid a phenomenon in which when the center of curvature of the lens surface is decentered, adjacent lens curved surfaces approach each other, making the lens thickness extremely thin.

[Function of reader of third embodiment]

With the color image reader, a color image of a document 18 placed on the platen glass 17 is exposed by the lamp 11 and reflected light is guided into the lens unit 14 via the full-rate mirror 12 and the half-rate mirrors 13.

Since the second surface of the lens unit is a color dispersion surface, image light is subjected to color dispersion and each color light forms an image on the line image sensor 15 by the lenses.

Figure 28:
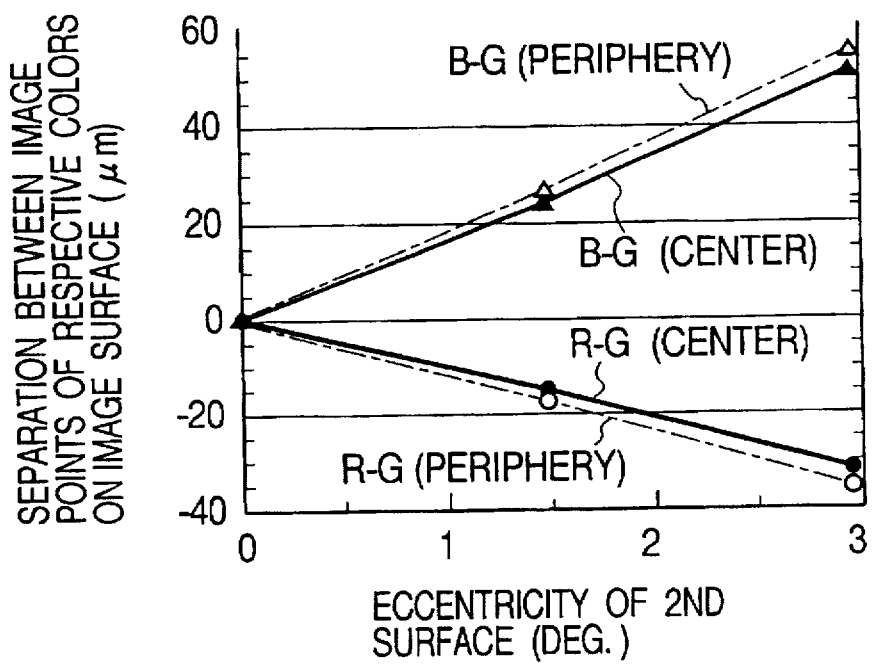
FIG. 28 is a graph showing the relationship between the decentering amount of lens interface curved surface and the separation distance of each color image point on the image surface in the color image reader shown in FIG. 22A.

FIG. 28 shows separation of three color images on the second surface, namely, the lens surface with the decentered center of curvature. It shows how much the center of gravity of the point image of each color is separated on the image formation surface by assuming that typical wavelengths of the three color images are the following values, wherein the decentering amounts of the lens surface are used in degrees (°) to enter the horizontal axis of the graph in FIG. 28:

Blue (B): 440 nm
Green (G): 530 nm
Red (R): 650 nm

As shown in FIG. 28, with the decentering 1.5° (decentering amount on the lens surface: 3 mm), the separation distances between R and G and B and G are about 16 μm and about 28 μm respectively, and an image is formed on the line image sensor shown in FIG. 23. The image separation distance on peripheries, namely, around both ends in the main scanning direction also differs only about 10% from that at the center, and the image can be sufficiently read by the line image sensor.

Figure 29:
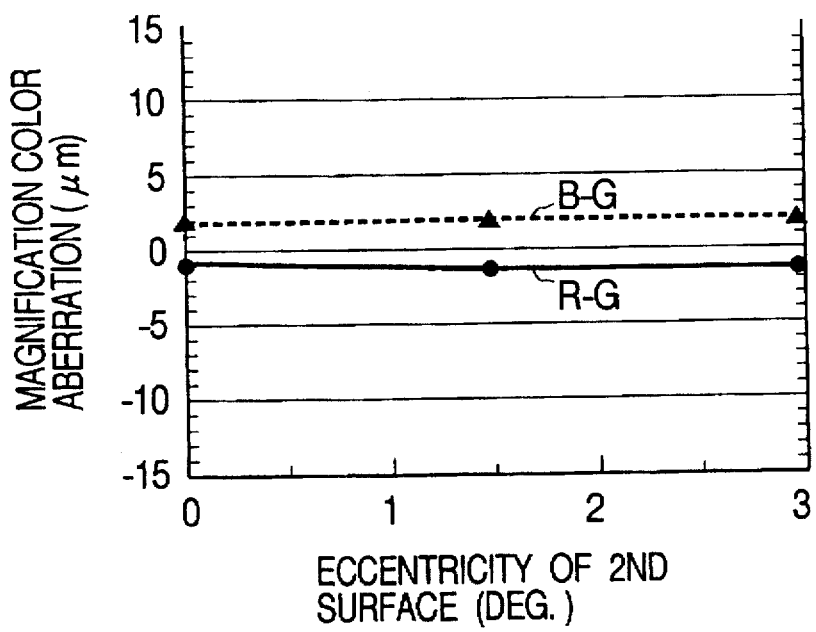
FIG. 29 is a graph showing the relationship between the decentering amount of lens interface curved surface and magnification chromatic aberration on the image surface in the color image reader shown in FIG. 22A.

FIG. 29 shows the measurement result of magnification chromatic aberration occurring in the embodiment.

As shown in the figure, the magnification chromatic aberration between B and G and that between R and G are little affected by the decentering amount and each 2-3 μm or less, small as compared with the photosensitive element spacing 14 μm; it can be considered that the image is little degraded due to the magnification chromatic aberration.

Next, results of an experiment made for checking the resolution performance of the embodiment is shown.

Figure 30:
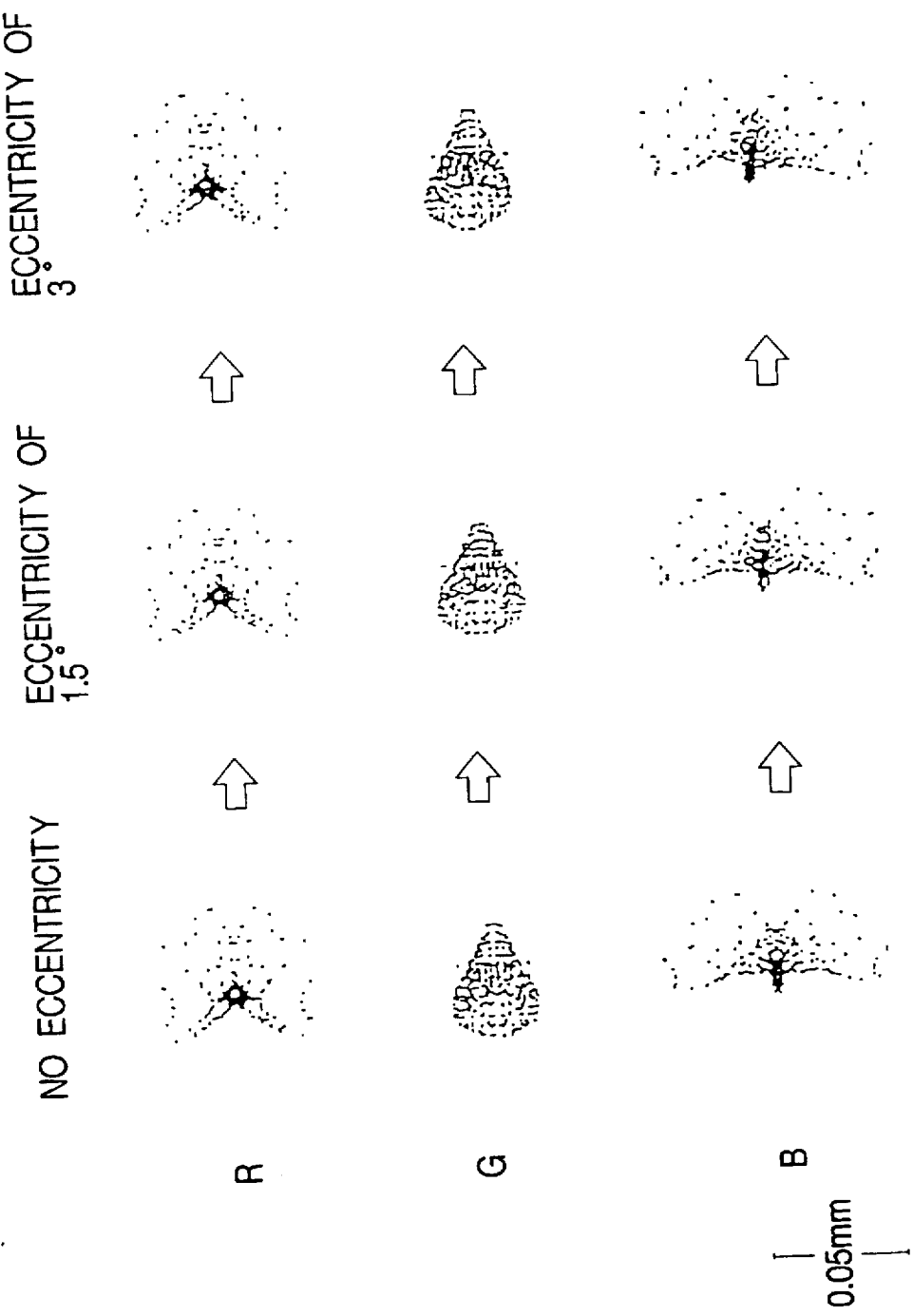
FIG. 30 is an illustration showing image change when spot diagrams are read by the color image reader shown in FIG. 22A.
Figure 31A:
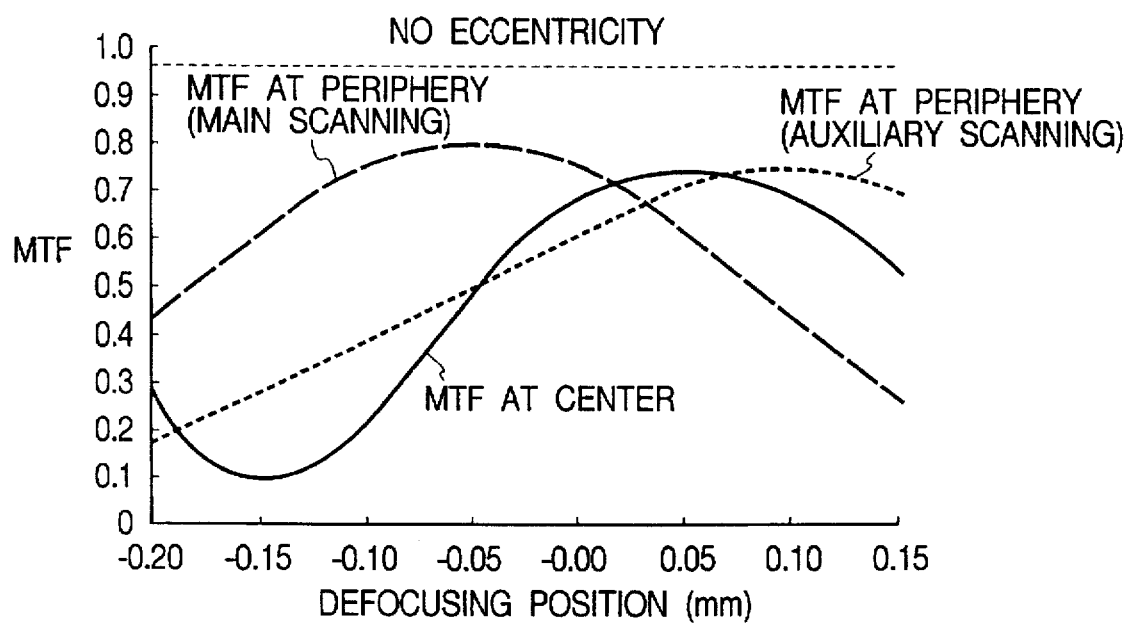
FIGS. 31A and 31B are graphs showing MTF for blue light of the lens unit shown in FIG. 22B.
Figure 31B:
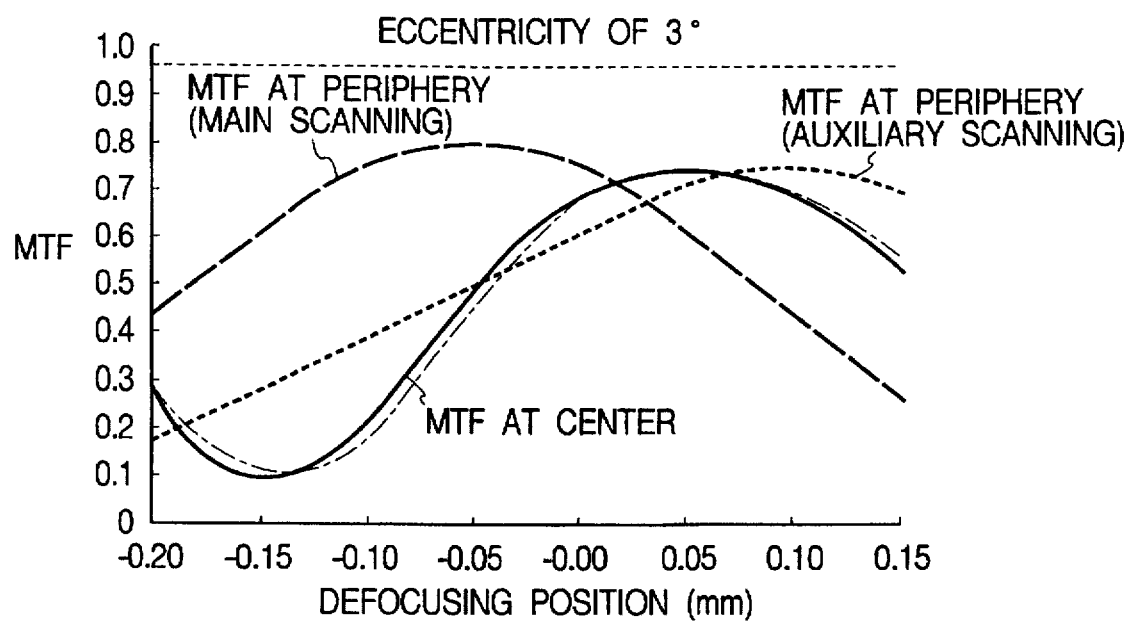

FIG. 30 shows image change when spot diagrams are read by the color image reader of the embodiment, wherein the results when the decentering of the second surface of the lens unit is θ=1.5° and θ=3.0° are compared with the result when no decentering exists. As shown in the figure, the image is little changed by decentering the lens curved surface. However, for blue (B) light, a slight refractive index difference occurs between the glass members on both sides of the second surface, as shown in FIG. 26, thus some change appears in the point image. On the other hand, FIGS. 31A and 31B show MTF (modulation transfer function) for blue (B) light of the lens unit used in the embodiment.

As understood from the figures, the MTF characteristic is little changed by decentering the center of curvature of the lens surface.

Thus, the color image reader of the embodiment can produce color dispersion without changing the image formation characteristic by decentering the combined lens and separate image light from the same line on a document surface into three primary colors for read by the image sensor. The effect of producing the color dispersion is the same as the effect produced by inserting a prism unit in an optical path, but magnification chromatic aberration occurring when the prism unit is used can be reduced.

[Manufacturing method of combined lens used in third embodiment]

Next, a manufacturing method of the combined lens used in the embodiment will be discussed.

The centers of curvature of the first and third surfaces of the combined lens exist on the optical axis and only the center of curvature of the second surface is decentered from the optical axis. When such a state is observed for each lens, the first and second lenses have axial centers and the directions of the axial centers do not match. (See FIG. 25.) Therefore, after each lens is formed so that both surfaces thereof have a predetermined curvature, when the lenses are combined, the axial centers are displaced, thereby forming such combined lens.

At this time, if the displacement amount is large, most of the periphery of a lens formed so that its outer peripheral edge becomes a circle will be truncated; it is much wasting. Thus, preferably only necessary curved surface portions of lenses are previously manufactured with an allowance and the decentering amounts are adjusted for combining the lenses.

Figure 32:
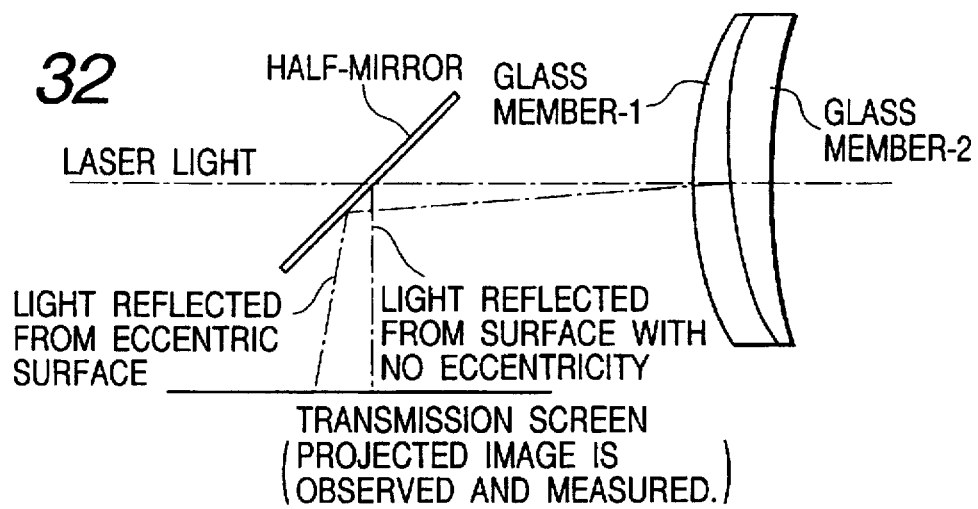
FIG. 32 is an illustration showing a method of adjusting lens decentering amounts for combining the lenses.

FIG. 32 is an illustration showing a method of adjusting lens decentering amounts for combining the lenses As shown here, the components are set so that a laser beam is vertically incident on the surface with the center of curvature not decentered, and the separation distance between light reflected on the surface with the center of curvature decentered and the surface with the center of curvature not decentered is measured, whereby the inclination of the surface with the center of curvature decentered with respect to the optical path can be measured. While such measurement is being executed, the displacement amount of the first and second lenses can be adjusted for setting the curvature inclination to a predetermined amount.

This method can be executed more accurately and more easily than a method of grinding so that the apex angle becomes a predetermined value in prism production.

Fourth Embodiment

Next, a color image reader according to a fourth embodiment of the invention will be discussed.

The color image reader of the embodiment comprises two color dispersion means; the first color dispersion means consists of two prisms brought into intimate contact with each other and the second dispersion means is made up of two adjacent lenses in intimate contact with each other for producing color dispersion in the auxiliary scanning direction to the optical axis of image light.

[Configuration of reader of fourth embodiment]

Figure 33A:
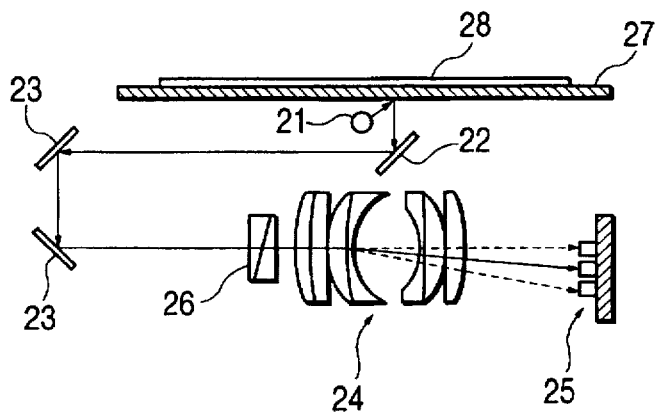
FIGS. 33A and 33B are a schematic drawing showing the configuration of a color image reader according to a fourth embodiment of the invention and a sectional view showing the structures of a prism unit and a lens unit used in the color image reader.
Figure 33B:
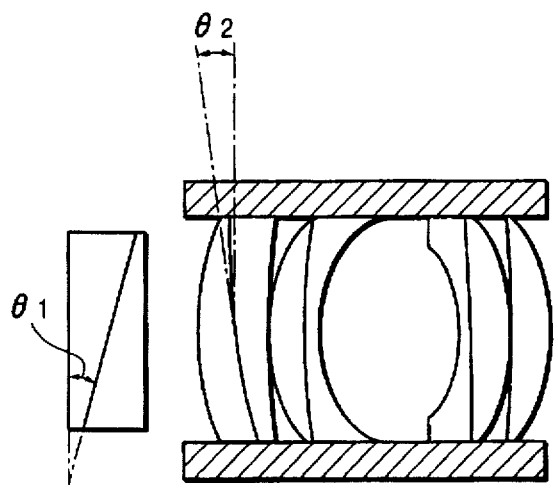

FIGS. 33A and 33B are a schematic drawing showing the configuration of the color image reader and a sectional view showing the structures of a lens unit and prism unit used in the color image reader.

Like the color image reader of the third embodiment shown in FIG. 22A, the color image reader of the fourth embodiment has a lamp 21, a full-rate mirror 22, half-rate mirrors 23, a lens unit 24, and a line image sensor 25. It further includes a prism unit 26 on the document side of the lens unit 24.

The prism unit 26 comprises two prisms having an equal apex angle overlaid so that their apices are located at opposite positions, the prisms being made of glass members almost the same in approximate value of refractive index and different in color dispersion characteristic, namely, Abbe number. Thus, refraction occurs little at the interface therebetween, but color dispersion is produced. Since the apex angles of the two prisms are equal, the incident and exit faces become parallel, forming substantially parallel flat glass as the entire prism unit.

The lens unit 24 comprises seven lenses in combination; the first and second lenses, the third and fourth lenses, and the fifth and sixth lenses are brought into intimate contact with each other as laminated lenses.

The center of curvature of the curved surface as the interface between the first and second lenses of the lens unit 24 is decentered, and the curved surface produces color dispersion in the opposite direction in the auxiliary scanning direction and the color dispersion surface of the prism unit.

The first and second lenses are made of glass members almost the same in approximate value of refractive index and different in dispersion characteristic; the glass members are selected so that partial dispersion in the blue range at the interface therebetween becomes larger than partial dispersion in the blue range by the prism unit.

Figure 34:
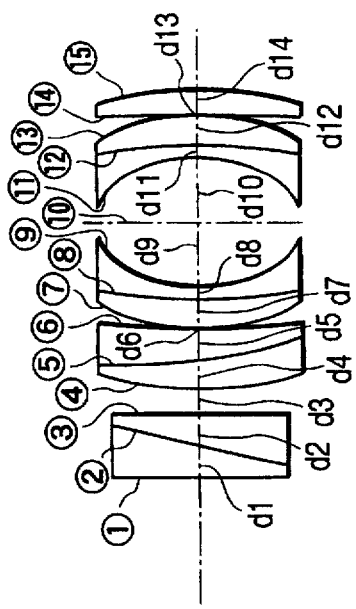
FIG. 34 is an illustration showing the structure of the prism unit and lens unit used in the color image reader shown in FIG. 33A and a table listing the lens surface curvatures, surface spacing, and refractive indexes and Abbe numbers of glass members making up the prism or lens unit.

FIG. 34 shows the curvature of and the surface spacing between the optical surfaces of the prism unit 26 and the lens unit 24 and the refractive index and Abbe number of each of the glass members making up the units.

Abnormal dispersion glass members as well as standard glass members are selected for the glass members used as the prisms. The standard glass members are glass members each having the Abbe number and partial dispersion ratio contained in range A surrounded by the broken line in FIG. 12; as the Abbe number lessens, the partial dispersion ratio increases. In contrast, the abnormal dispersion glass members are glass members outside the range having the relation; they are indicated by range B surrounded by the broken line in FIG. 12.

The partial dispersion ratio $P_{gF}$ is represented by the following equation:

$$P_{gF}=\{n(\lambda_g)-n(\lambda_F)\}/\{n(\lambda_F)-n(\lambda_C)\}$$

C-line beam: wavelength $\lambda_C$=656.3 nm
d-line beam: wavelength $\lambda_d$=587.6 nm
F-line beam: wavelength $\lambda_F$=486.1 nm
g-line beam: wavelength $\lambda_g$=435.8 nm From the value of the partial dispersion ratio PgF, the partial dispersion characteristic is seen as the ratio between an average color dispersion characteristic in the visible range $\{n(\lambda_F)-n(\lambda_C)\}$ and color dispersion characteristic in the blue range $\{n(\lambda_g)-n(\lambda_F)\}$.

[Functions of reader of fourth embodiment]

With the color image reader, a color image of a document 28 placed on the platen glass 27 is exposed by the lamp 21 and reflected light is guided into the prism unit 26 and the lens unit 24 via the full-rate mirror 22 and the half-rate mirrors 23 and 23. Each of the prism unit and the lens unit has a color dispersion surface; color dispersion is produced on the color dispersion surface of the prism unit (first color dispersion surface) and further on the color dispersion surface of the lens unit (second color dispersion surface), color dispersion of each color light is produced in the opposite direction to the first color dispersion surface, as shown in FIG. 49. An image is formed on the sensor surface by the lens unit 24. As the color dispersion nature on the color dispersion surfaces, partial dispersion in the blue range becomes large and image light after passing through the first dispersion surface has the spacing between green light (G) and blue light (B) larger than that between red light (R) and green light (G), but is refracted in the opposite direction on the second color dispersion surface with larger partial dispersion in the blue range than the first color dispersion surface for correcting the color light spacing, so that red (R), green (G), and blue (B) image lights form an image on three lines of the CCD image sensor arranged at equal spacing. Therefore, without lowering sensitivity by narrowing the spacing between red and green read lines of the sensor, a color image can be read using the sensor having a sufficient device area such that the picture element pitch in the main scanning direction and the read line spacing become the same, as shown in FIG. 3.

The lens unit having the lens curved surface with the center of curvature decentered and the prism unit for producing color dispersion are thus combined, whereby the tilt angle of the dispersion surface with small partial dispersion in the blue range (first color dispersion surface) can be made large, the color dispersion amount on the sensor surface is increased, and the line sensor having the same color line spacing as the photosensitive element spacing in the main scanning direction shown in FIG. 3 can be used.

The dispersion degree at the prism interface is comparatively small and the tilt angle becomes large, thus strict accuracy of the tilt angle is not required. In contrast, on the color dispersion surface in the lens unit, the color dispersion degree is large and the tilt angle is small, thus strict accuracy of the tilt angle is required. However, since the tilt angle can be set accurately while the decentering amount is varied in the lens unit, a highly accurate color dispersion read optical system can be easily provided by combining the prism unit and the lens unit.

Figure 35:
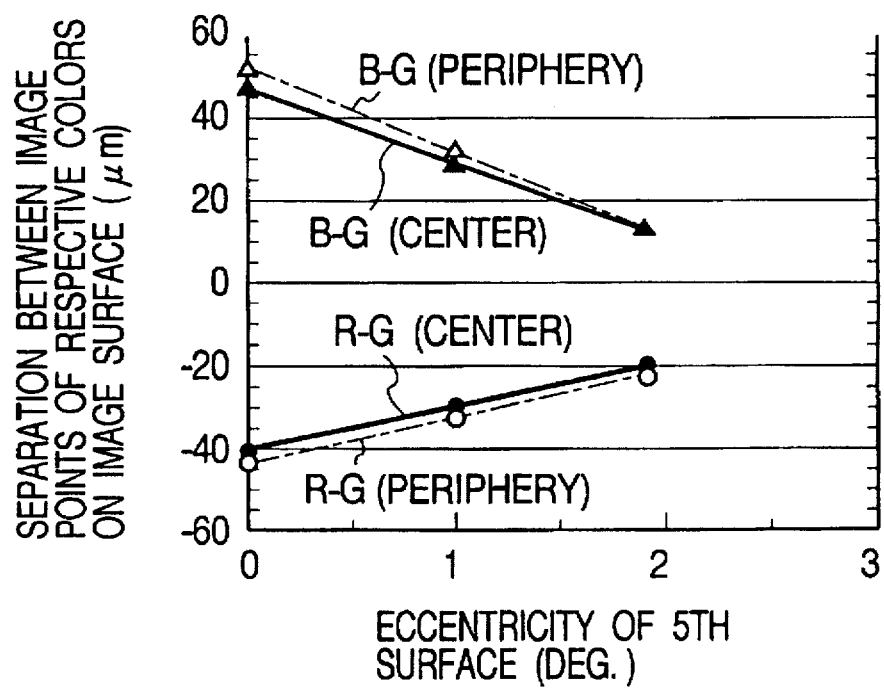
FIG. 35 is a graph showing the relationship between the decentering amount of lens interface curved surface and the separation distance of each color image point on the image surface in the color image reader shown in FIG. 33A.

FIG. 35 shows the separation distances of three colors of red (R), green (G), and blue (B) when the inclination of the color dispersion surface (fifth surface) of the lens unit is changed. Here, red, green, and blue are calculated as the following single-wavelength lights:

Red: $\lambda_R$=650 nm
Green: $\lambda_G$=530 nm
Blue: $\lambda_B$=440 nm

As the tilt angle of the fifth surface increases, the separation distance of each color image lessens; the separation distance between B and G becomes equal to that between R and G at about 1°.

When the tilt angle changes 0.1°, the separation distance between B and G shifts about 1/10 of the photosensitive element pitch. Thus, accuracy of the tilt angle is required, but strict adjustment can be made by displacing the lenses.

Figure 36:
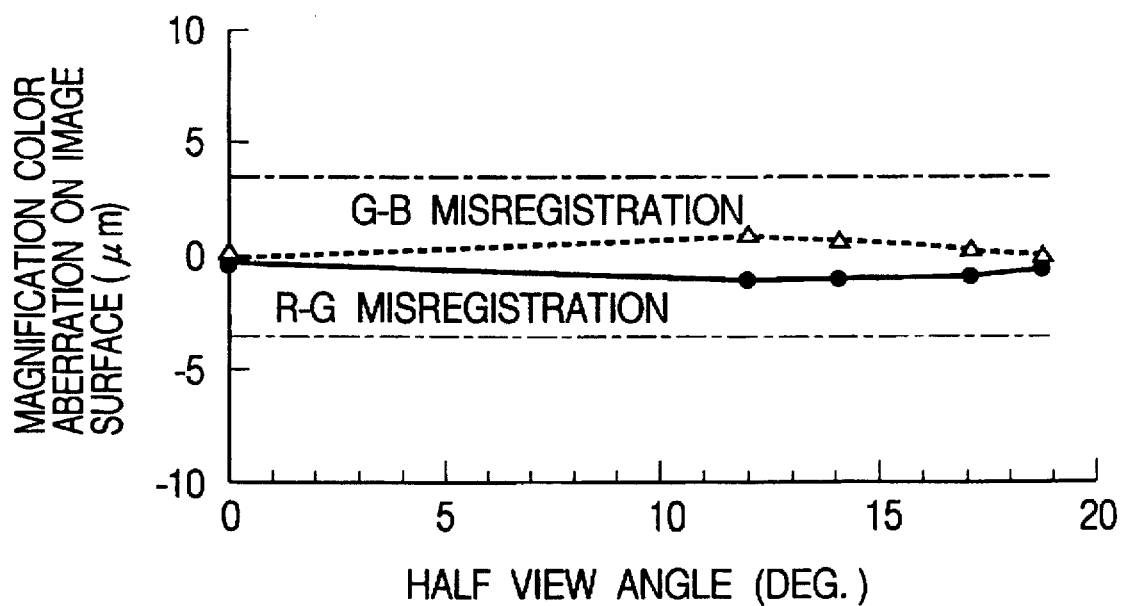
FIG. 36 is a graph showing the relationship between half view field and magnification chromatic aberration in the color image reader shown in FIG. 33A.

FIG. 36 shows magnification chromatic aberration in the embodiment; it shows the distribution in the main scanning direction. As shown here, as the half view angle increases, the aberration slightly increases, but is suppressed to a small value of 2 μm or less.

Magnification chromatic aberration occurring in the prism unit as described above is produced in the opposite direction when the lens unit is designed, thereby preventing the effect of the magnification chromatic aberration.

Fifth Embodiment

Next, a color image reader according to a fifth embodiment of the invention will be discussed.

The color image reader of the fifth embodiment comprises first and second color, dispersion means each made of adjacent lenses in intimate contact with each other; the interface therebetween provides a color dispersion surface for producing color dispersion in the auxiliary scanning direction.

Figure 37A:
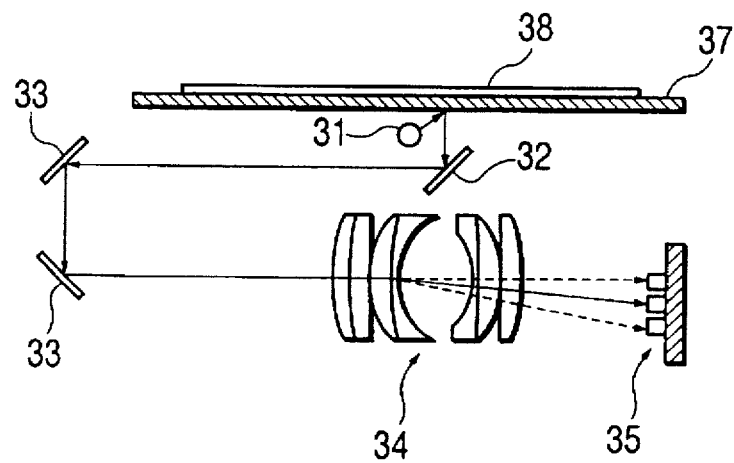
FIGS. 37A and 37B are a schematic drawing showing the configuration of a color image reader according to a fifth embodiment of the invention and a sectional view showing the structure of a lens unit used in the color image reader.
Figure 37B:
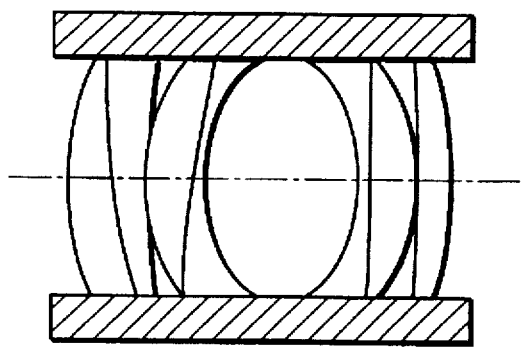

FIGS. 37A and 37B are a schematic drawing showing the configuration of the color image reader of the embodiment and a sectional view showing the structure of a lens unit used in the color image reader.

The color image reader has a lamp 31, a full-rate mirror 32, half-rate mirrors 33, a lens unit 34, and a line image sensor 35. The lens unit comprises seven lenses in combination; the first and second lenses, the third and fourth lenses, and the fifth and sixth lenses are brought into intimate contact with each other as laminated lenses. The centers of curvature of the lens curved surface as the interface between the first and second lenses and the lens curved surface as the interface between the third and fourth lenses are decentered in the opposite direction of the auxiliary scanning direction.

The first and second lenses and the third and fourth lenses are made of glass members almost the same in approximate value of refractive index and different in dispersion characteristic; their interfaces provide first and second color dispersion surfaces.

The glass members are selected for the first color dispersion surface so that partial dispersion in the blue range becomes comparatively small and for the second color dispersion surface so that partial dispersion in the blue range becomes comparatively large.

Figure 38:
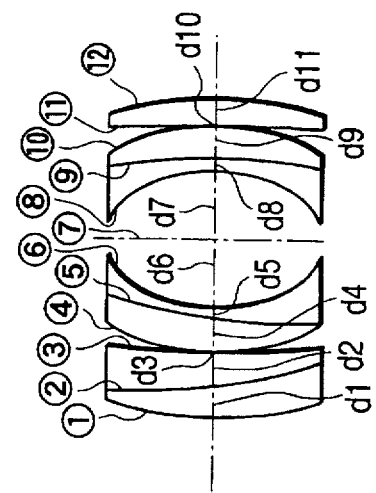
FIG. 38 is an illustration showing the structure of a lens unit used in the color image reader shown in FIG. 37A and a table listing the lens surface curvatures, surface spacing, and refractive indexes and Abbe numbers of glass members making up the lens unit.

FIG. 38 shows the curvature of and the surface spacing between the of lens surfaces making up the lens unit 34 and the refractive index and Abbe number of each of glass members as lenses.

Figure 39:
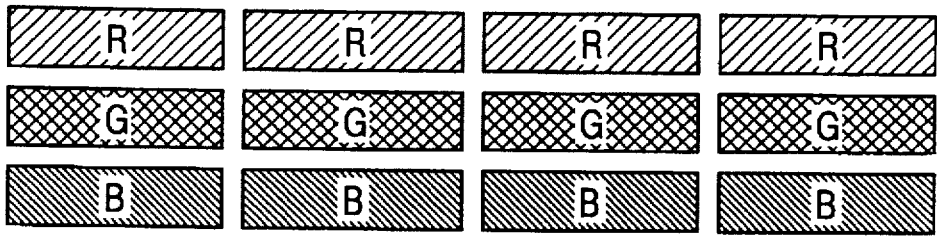
FIG. 39 is an illustration showing the arrangement of photosensitive elements of a line image sensor used in the color image reader shown in FIG. 37A.

With the color image reader, reflected light on the document surface is guided into the lens unit 34 via the full-rate mirror 32 and the half-rate mirrors 33, and an image is formed on the sensor surface by the lens unit 34. Color dispersion to red light (R), green light (G), and blue light (B) is produced on the first color dispersion surface and further color dispersion is produced in the opposite direction on the second color dispersion surface for correcting the separation distance of each color light, whereby red (R), green (G), and blue (B) image lights form an image on the sensor surface at almost equal spacing and can be read by the line image sensor having read lines of three colors narrowed and arranged at equal spacing as shown in FIG. 39.

Therefore, a 3-color image can be read from the same line on the document only by the lens unit without using prisms; magnification chromatic aberration is reduced and resolution lowering caused by increasing partial dispersion in the blue range can be suppressed.

Since the embodiment uses the lens interfaces as color dispersion surfaces, the color dispersion surfaces cannot largely be inclined and the image separation distance lessens. Therefore, preferably the high-integrated line sensor as shown in FIG. 39 is used in combination.

Sixth embodiment

Next, a color image reader according to a sixth embodiment of the invention will be discussed.

The color image reader of this embodiment comprises first color dispersion means consisting of two prisms brought into intimate contact with each other and second dispersion means made up of two adjacent lenses in intimate contact with each other for producing color dispersion in the main scanning direction to the optical axis of image light.

[Configuration of reader of sixth embodiment]

Figure 40A:
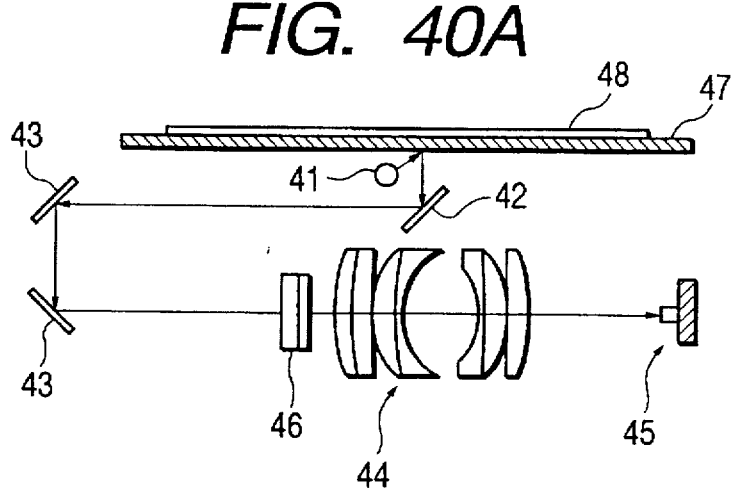
FIGS. 40A and 40B are a schematic drawing showing the configuration of a color image reader according to a sixth embodiment of the invention and a sectional plan view showing the structures of a prism unit, a lens unit, and an image sensor used in the color image reader.
Figure 40B:
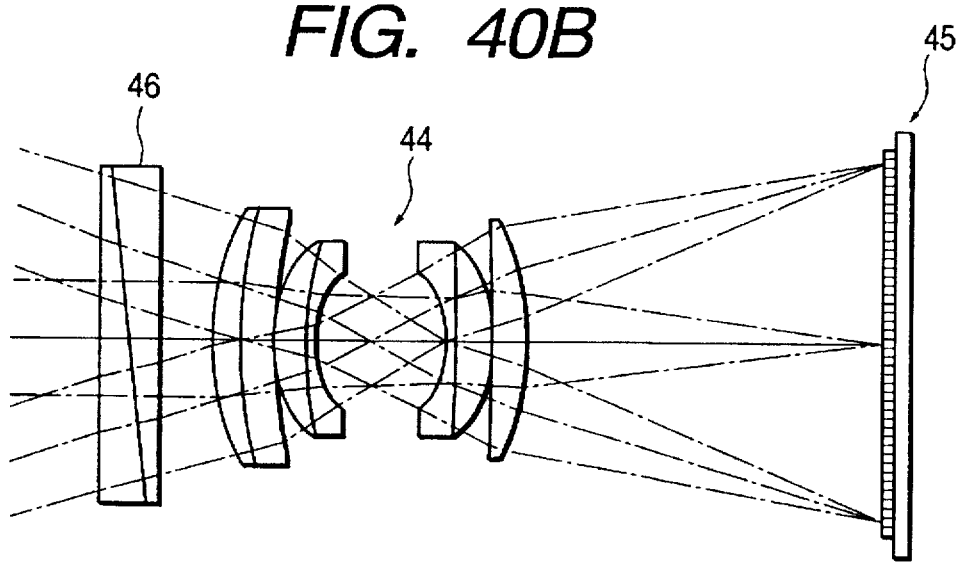
Figure 41:
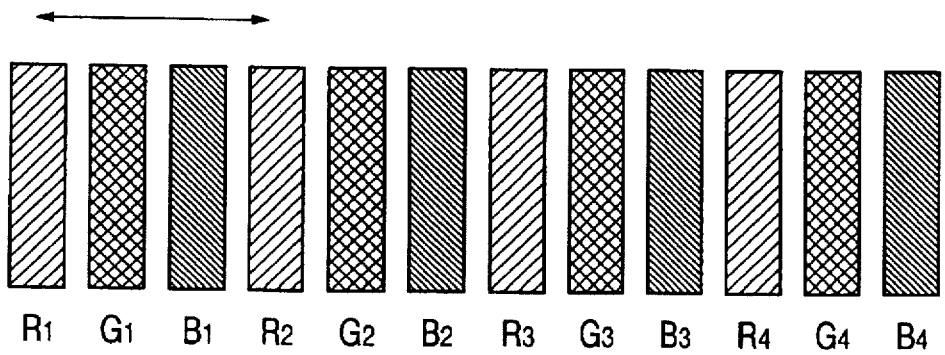
FIG. 41 is an illustration showing the arrangement of photosensitive elements of the image sensor used in the color image reader shown in FIG. 40A.

FIGS. 40A and 40B are a schematic drawing showing the configuration of the color image reader and a sectional plan view showing the structures of a lens unit, a prism unit, and an image sensor used in the color image reader.

Like the color image reader of the fourth embodiment shown in FIG. 33A, the color image reader of the sixth embodiment has a lamp 41, a full-rate mirror 42, half-rate mirrors 43, a prism unit 46, a lens unit 44, and a line image sensor 45. The interface curvature and surface spacing and the refractive index and Abbe number of each of the prisms or lens of the prism unit 46, lens unit 44 are the same values as shown in FIG. 34.

However, in the embodiment, the interface between the two prisms (second surface) is inclined in the main scanning direction for producing color dispersion in the main scanning direction. The center of curvature of the lens curved surface as the interface between the first and second lenses of the lens unit 44 is decentered in the main scanning direction for producing color dispersion in the opposite direction to the color dispersion surface of the prism unit 46.

The tilt angle of the color dispersion surface is a third of that in the reader shown in FIGS. 33 and 34 and the dispersion distance of each color light dispersed is small, thus the luminous flux incident at the maximum view angle from the both side ends of a document also passes through the two color dispersion surfaces without departing from the prisms or lenses for forming an image.

The line image sensor 45 has one read line comprising a large number of photosensitive elements arranged in the main scanning direction, and the device density is three times that of the image sensor shown in FIG. 3. Red (R), green (G), and blue (B) on-chip filters are mounted in order, and the read density per color is 14-μm pitches as in the image sensor shown in FIG. 3.

[Functions of reader of sixth embodiment]

Figure 50:
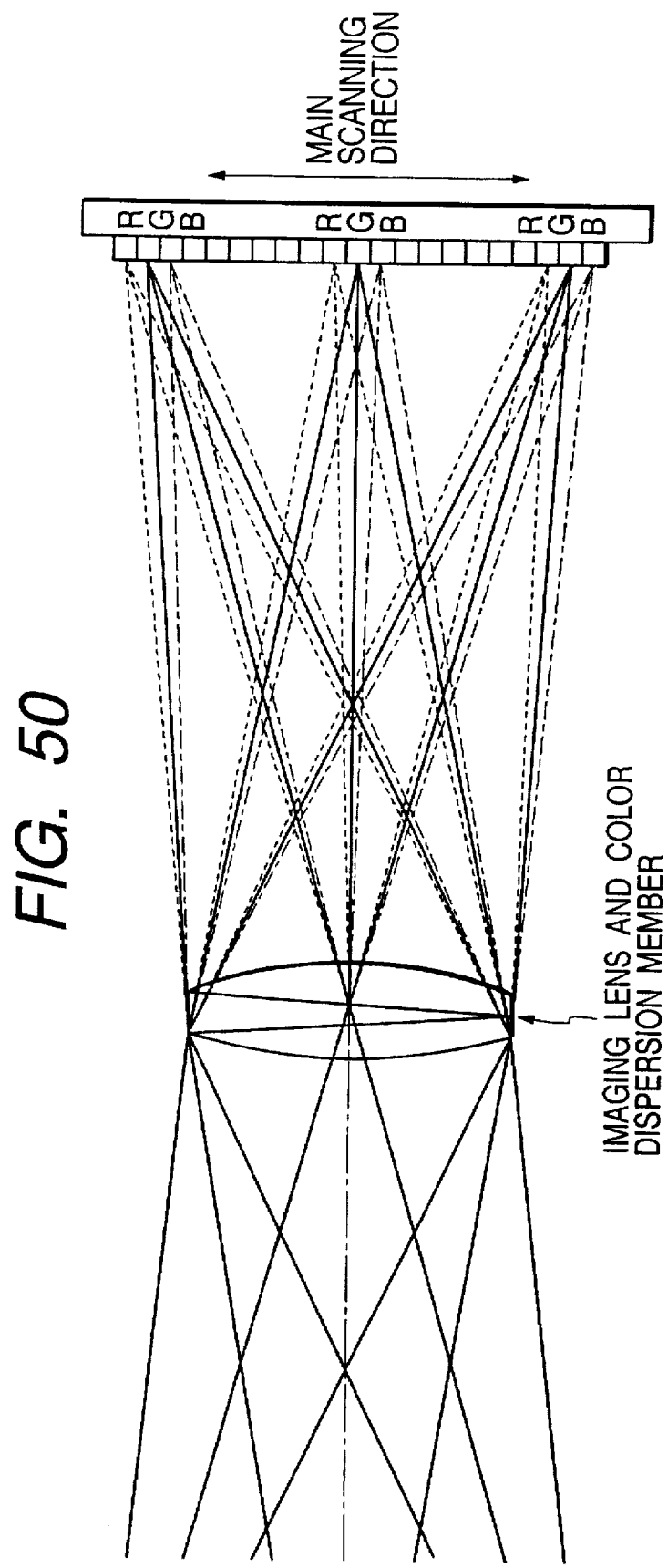
FIG. 50 is a conceptual drawing showing optical paths and image formation positions when color dispersion is produced in the main scanning direction in the color image reader of the invention.

With the color image reader, image light reflected on the document surface is subjected to color dispersion by the prism unit 46 and the lens unit 44 in the main scanning direction, and an image is formed at almost the same spacing as the spacing of the devices arranged like red, green, blue as shown in FIG. 50. Therefore, every three of the photosensitive elements of the image sensor 45 (devices having red, green, blue on-chip filters) read image light from the same position on the document surface by selectively reading an optical image of the wavelength zone limited by the spectral characteristics of the on-chip filters among image lights spread by color dispersion. Thus, the three colors are balanced in resolution and a proper tone image can be reproduced.

Generally, the conventional color image readers do not execute color separation in the main scanning direction for reading image light as described above, and read positions of three colors are displaced by a third of the read pitch.

To correct it digitally, the following interpolation operation processing between adjacent pixels is performed:

$R_i' = (2/3)R_i + (1/3)R_{i+1}$
$G_i' = G_i$
$B_i' = (2/3)B_i + (1/3)B_{i-1}$

However, since this processing is also color gradation processing for two colors of R and B, the three colors are unbalanced in resolution.

In contrast, the color image reader of the embodiment solves the problem and provides good resolution balance among the three colors in read image signals.

Figure 42:
FIG. 42 is an illustration showing image change when spot diagrams are read by the color image reader shown in FIG. 40A.
Figure 42:
Figure 42:
Figure 42:
Figure 42:
Figure 42:
Figure 42:
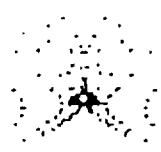
Figure 42:
Figure 42:
Figure 43:
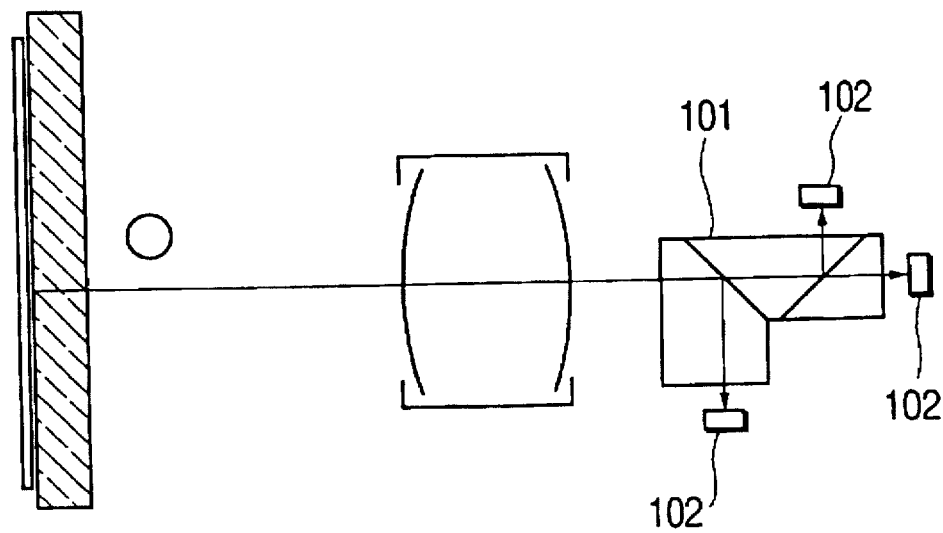
FIG. 43 is a schematic drawing showing an example of a conventional color image reader.
Figure 44:
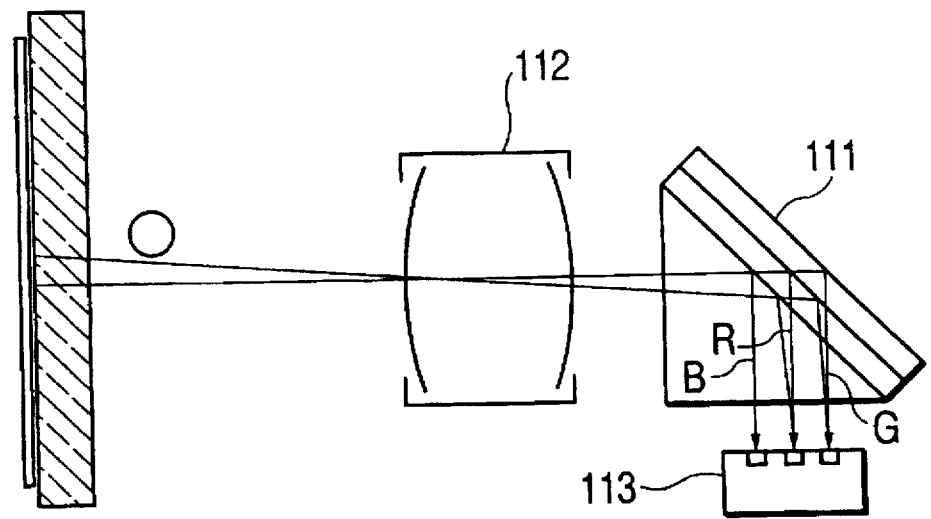
FIG. 44 is a schematic drawing showing another example of a conventional color image reader.
Figure 45:
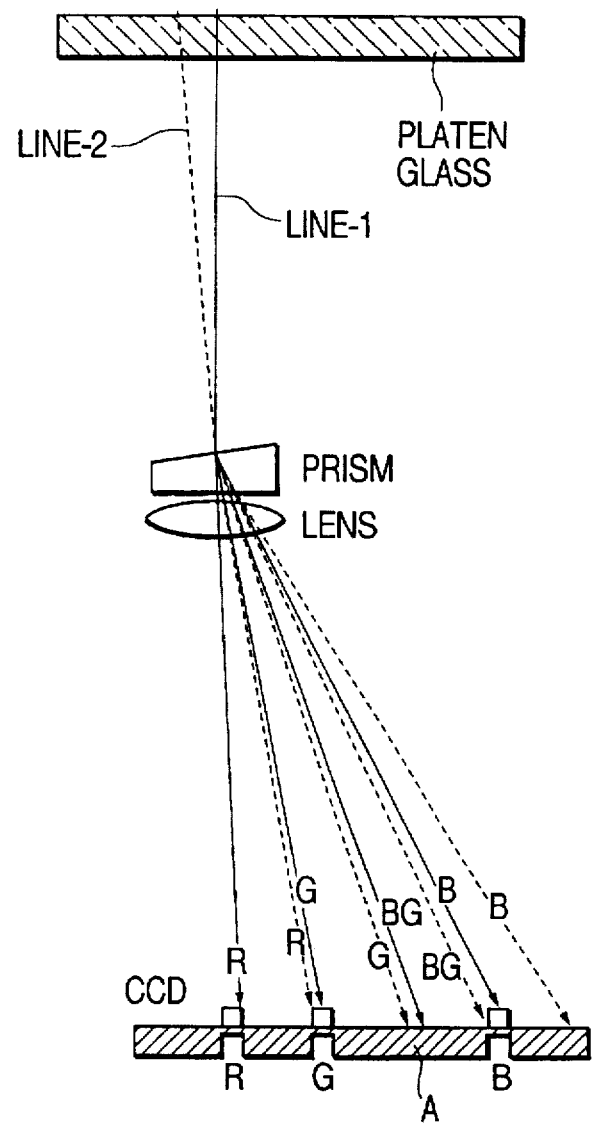
FIG. 45 is an illustration showing a problem in a conventional color image reader for producing color dispersion with a prism.
Figure 46:
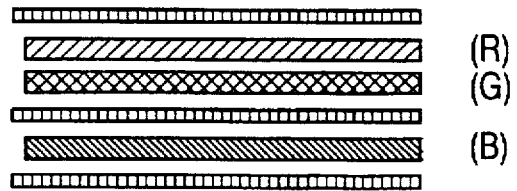
FIG. 46 is illustrations showing line image sensors used in the reader shown in FIG. 45.
Figure 47:
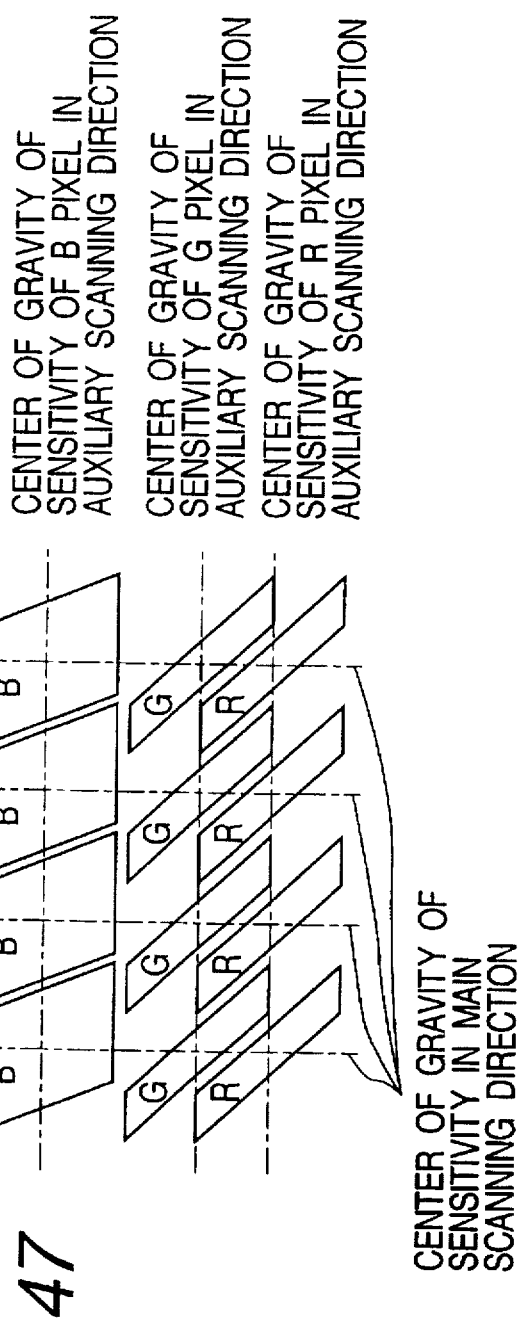
FIG. 47 is an illustration showing an example of a line image sensor having a special photosensitive element arrangement.
Figure 48:
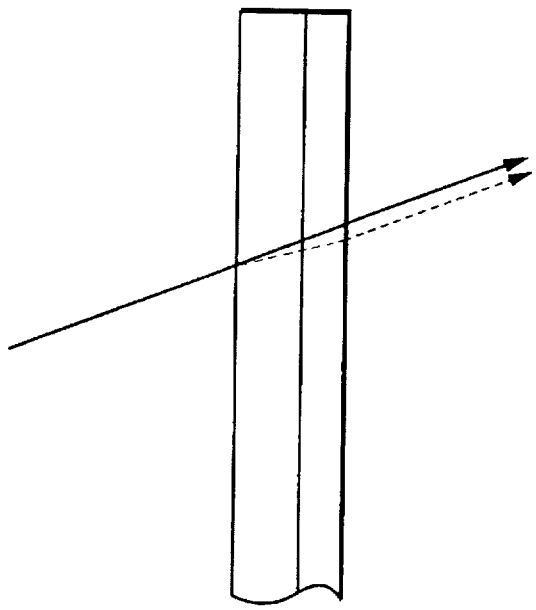
FIG. 48 is an illustration explaining occurrence of magnification chromatic aberration caused by a prism.

Next, to examine the effect when two color dispersion surfaces are inclined in the main scanning direction to the optical axis, the reader of the embodiment reads spot diagrams and change of the images is studied. FIG. 42 shows the result.

Strictly speaking, the optical path state differs between the image formation luminous flux traveling left forward from the right and that traveling right forward from the left. However, it has a small effect on the image formation state because the refractive index difference between the two glass members with the color dispersion surface between is small and the color dispersion surface angle is comparatively small; as shown in FIG. 42, both conditions of image formation luminous fluxes incident from left and right at design view field 18.7 degrees differ little from the condition when the color dispersion surface is not inclined.

Since the tilt angle of the lens decentered surface with the optical axis is about 0.7 degrees particularly in this embodiment, the effect of the refractive index difference on both sides of the decentered surface is small (in the embodiment, the refractive index difference in the blue range is about 0.02 degrees). For application to the case where the color dispersion amount may be small, the condition of lessening the refractive index difference on both sides of the decentered surface can be comparatively loosened.

This embodiment uses color dispersion by the prism unit and color dispersion by decentering by the lens unit in combination. However, the glass members between which the decentered surface is sandwiched are made thick, whereby the two surfaces in the image forming lens as shown in FIG. 37B can also be decentered for use as two color dispersion surfaces. If correction accuracy of positions of the three colors may be loose, only one surface can also be decentered for providing only one color dispersion surface for the reader.

As described above, in the color image reader of the invention, an image of each color light is formed on the sensor surface through the first and second color dispersion means. At this time, the characteristic that partial dispersion in the blue range in the first color dispersion means becomes large is corrected by the second color dispersion means, thus an image of each color light of red (R), green (G), and blue (B) is formed at positions almost equally spaced on the sensor surface; each color image can be read at proper positions without making an overlarge separation distance from the optical axis.

Therefore, if the color dispersion is produced in the main scanning direction and the image light is read by the image sensor comprising a plurality of read lines disposed in the auxiliary scanning direction each consisting of a large number of photosensitive elements arranged in the main scanning direction, blue MTF lowering caused by partial dispersion which becomes large in the blue range can be suppressed, improving resolution. Further, a good image can be read using a general-purpose image sensor without using an image sensor of a special device arrangement.

If the color dispersion is produced in the main scanning direction and the image light is read by the image sensor comprising a large number of photosensitive elements for detecting red, green, and blue lights arranged in the main scanning direction, the photosensitive elements every three adjacent colors read image light from the same position on the document surface, providing an image signal good in resolution balance among the three colors.

Using the prism unit as the color dispersion means, color dispersion is produced by a simple optical system and adjustment of partial dispersion is facilitated.

The color dispersion means is made up of one or more lenses contained in the lens unit, whereby an image of image light incident from both ends in the main scanning direction can also be formed without producing magnification chromatic aberration.

Further, the color dispersion means is made of two adjacent lenses and the center of curvature of the curved surface as the interface between the two adjacent lenses is decentered in the main or auxiliary scanning direction to the optical axis, whereby the color dispersion surface can be easily set in the lens unit. Since the color dispersion surface is inclined by decentering the center of curvature of the lens curved surface, the tilt angle can be set accurately.

The color dispersion means is made of two transparent optical members with the refractive index ratio varying depending on the light wavelength, whereby the color dispersion amount can be adjusted by changing only the interface angle, and the outer form of the color dispersion means can be made as an optical plane with less aberration occurrence.

The glass members are selected so that the adjacent transparent optical members have almost the same refractive index zone varying depending on the light wavelength, whereby on the interface therebetween, image light is not largely refracted as a whole, providing good resolution without producing astigmatism.

What is claimed is:

1. A color image reader comprising:

a lamp for exposing a document surface and having reflected light travel along an optical axis;

first color dispersion means for producing a first color dispersion of light reflected from the document surface being exposed by said lamp;

second color dispersion means for producing a second color dispersion of the reflected light, the second color dispersion being in a different direction with respect to the optical axis as compared to the first color dispersion and having larger partial dispersion in a blue range than the first color dispersion; and means for reading an image carried by the reflected light including the first and second color dispersion.

2. The color image reader as claimed in claim 1, wherein at least one of said first and second color dispersion means is a prism unit.

3. The color image reader as claimed in claim 1, further comprising a lens unit for imaging the reflected light, wherein at least one of said first and second color dispersion means is adjacent lenses contained in said lens unit.

4. The color image reader as claimed in claim 2, wherein an interface between transparent optical members forming said prism unit is inclined from an optical axis of the reflected light in an auxiliary scanning direction.

5. The color image reader as claimed in claim 3, wherein an interface between the adjacent lenses is a curved surface and a center of curvature thereof is decentered from an optical axis of the reflected light in an auxiliary scanning direction.

6. The color image reader as claimed in claim 2, wherein an interface between transparent optical members forming said prism unit is inclined from an optical axis of the reflected light in an auxiliary scanning direction.

7. The color image reader as claimed in claim 3, wherein an interface between the adjacent lenses is a curved surface and a center of curvature thereof is decentered from an optical axis of the reflected light in a main scanning direction.

8. The color image reader as claimed in claim 1, wherein at least one of said first and second color dispersion means includes two transparent optical members having different Abbe numbers.

9. The color image reader as claimed in claim 1, wherein at least one of said first and second color dispersion means includes two transparent optical members having different Abbe numbers and approximately the same wavelength range in which refractive indices vary with wavelength.

10. A color image reader comprising:

a lamp for exposing a document surface;

a lens unit including a plurality of lenses, for imaging light reflected from the document surface; and an image sensor being placed at an imaging position of the reflected light, and including a reading line having a large number of photosensitive elements arranged in a main scanning direction, wherein image light is read by electrical scanning of said image sensor in the main scanning direction and by moving a read position in an auxiliary scanning direction; and wherein at least two adjacent lenses included in said lens unit are made of transparent optical materials having different Abbe numbers, and are adjacent to each other with a curved surface as an interface therebetween, a center of curvature of the curved surface being decentered from an optical axis of said lens unit in the main or auxiliary scanning direction.

* * * * *